US011800149B2

(12) United States Patent
Li et al.

(10) Patent No.: US 11,800,149 B2
(45) Date of Patent: *Oct. 24, 2023

(54) CODING IMAGE SLICES USING A STILL PICTURE PROFILE

(71) Applicant: Tencent America LLC, Palo Alto, CA (US)

(72) Inventors: Ling Li, Seoul (KR); Byeongdoo Choi, Palo Alto, CA (US); Xiang Li, Saratoga, CA (US); Stephan Wenger, Hillsborough, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,219

(22) Filed: Jul. 1, 2022

(65) Prior Publication Data
US 2022/0337871 A1 Oct. 20, 2022

Related U.S. Application Data

(63) Continuation of application No. 17/220,481, filed on Apr. 1, 2021, now Pat. No. 11,412,256.
(Continued)

(51) Int. Cl.
H04N 19/593 (2014.01)
H04N 19/174 (2014.01)
(Continued)

(52) U.S. Cl.
CPC ......... H04N 19/593 (2014.11); H04N 19/159 (2014.11); H04N 19/174 (2014.11); H04N 19/46 (2014.11); H04N 19/70 (2014.11)

(58) Field of Classification Search
CPC .................................................... H04N 19/593
See application file for complete search history.

(56) References Cited

U.S. PATENT DOCUMENTS

2007/0177810 A1 8/2007 Yang
2009/0010332 A1* 1/2009 Jeon ..................... H04N 19/154
375/E7.076
2011/0194613 A1* 8/2011 Chen .................... H04N 19/176
375/E7.2

FOREIGN PATENT DOCUMENTS

WO 2015098561 A1 7/2015

OTHER PUBLICATIONS

Supplementary European Search Report dated Sep. 23, 2022 in Application No. 21784393.7 (10 pages).
(Continued)

Primary Examiner — Jerry T Jean Baptiste
(74) Attorney, Agent, or Firm — ARENTFOX SCHIFF LLP

(57) ABSTRACT

A method of video encoding includes determining that a coded video bitstream conforms to one of a Main 10 still picture profile or a Main 4:4:4 10 still picture profile and generating profile information that indicates that each of the image slices is to be intra coded and indicates the one of the Main 10 still picture profile or the Main 4:4:4 10 still picture profile. The method further includes constraining only one picture to be included in the coded video bitstream according to the one of the Main 10 still picture profile or the Main 4:4:4 10 still picture profile. The method also includes performing intra prediction on each of the image slices, and encoding the picture based on the intra prediction and according to the one of the Main 10 still picture profile or the Main 4:4:4 10 still picture profile to form the coded video bitstream.

20 Claims, 12 Drawing Sheets

Related U.S. Application Data

(60) Provisional application No. 63/029,000, filed on May 22, 2020, provisional application No. 63/007,187, filed on Apr. 8, 2020.

(51) Int. Cl.
    *H04N 19/70*     (2014.01)
    *H04N 19/46*     (2014.01)
    *H04N 19/159*    (2014.01)

(56) References Cited

OTHER PUBLICATIONS

Joshi R: "Conformance Testing for HEVC Screen Content Coding (SCC) Extensions Draft 2", 24. JCT-VC Meeting; May 26, 2016-Jun. 1, 2016; Geneva; (Joint Collaborative Team on Video Coding of ISO/IEC JTC1/SC29/WG11 and ITU-T SG.16 ); No. JCTVC-X1018, May 26, 2016.

Joshi R et al: "Conformance Testing for HEVC Screen Content Coding (SCC) Extensions and Non-Intra High Throughput Profiles (Draft 6)", 28. JCT-VC Meeting; Jul. 15, 2017-Jul. 21, 2017; Torino; (Joint Collaborative Team on Video Coding of ISO/IEC JTC1/SC29/WG11 and ITU-T SG.16 ); No. JCTVC-AB1016, Oct. 18, 2017.

Ikai T et al: "MV-HEVC and 3D-HEVC Conformance Draft 4", 14. JCT-3V Meeting; Feb. 22, 2016-Feb. 26, 2016; San Diego; (The Joint Collaborative Team on 3D Video Coding Extension Development of ISO/IEC JTC1/SC29/WG11 and ITU-T SG.16 ), No. JCT3V-N1008, May 27, 2016.

International Search Report dated Aug. 16, 2021 in Application No. PCT/US2021 /025870 (17 pages).

Japanese Office Action dated Mar. 14, 2023 in Application No. 2022-519449, with English Translation (14 pages).

Benjamin Bross, Jianle Chen, Shan Liu, and Ye-Kui Wang, Versatile Video Coding (Draft 8), Joint Video Experts Team (JVET) of ITU-T SG 16 WP3 and ISO/IEC JTC 1/SC 29/WG 11, JVET-Q2001 (version 15), 17th Meeting: Brussels, BE, Mar. 12, 2020, pp. 1-24.

Jonatan Samuelsson, Sachin Deshpande, and Andrew Segall, AHG17: On Profile, tier, and level syntax structure, Joint Video Experts Team (JVET) of ITU-T SG 16 WP 3 and ISO/IEC JTC 1/SC 29/WG 11, JVETP0217, 16th Meeting: Geneva, CH, Sep. 2019, pp. 1-4.

\* cited by examiner

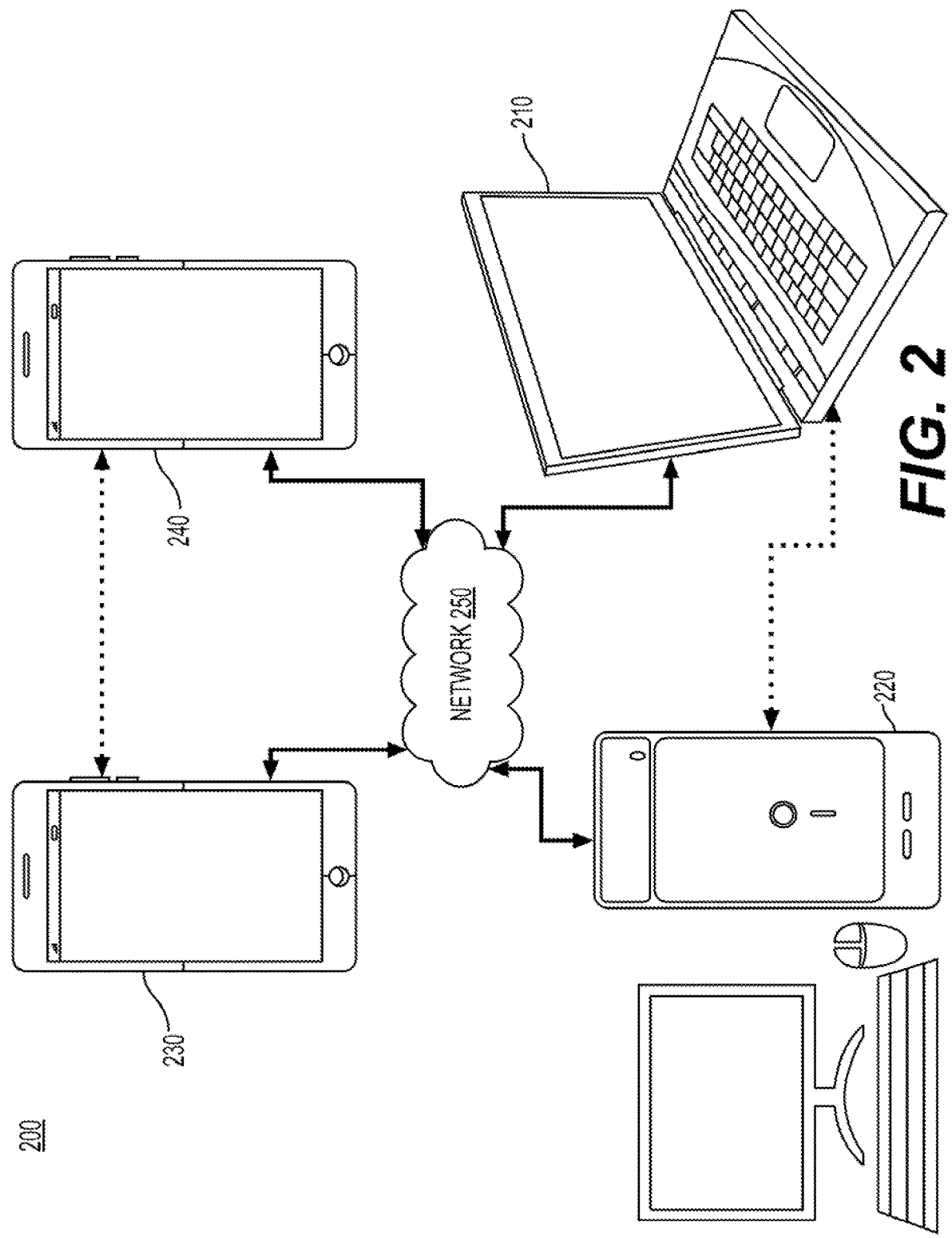

CODING IMAGE SLICES USING A STILL PICTURE PROFILE

INCORPORATION BY REFERENCE

The application is a continuation of U.S. Ser. No. 17/220,481 filed on Apr. 1, 2021, which claims the benefit of priority to U.S. Provisional Application No. 63/007,187, "CONSTRAINT ON SYNTAX ELEMENTS FOR VARIOUS PROFILES," filed on Apr. 8, 2020, and U.S. Provisional Application No. 63/029,000, "GROUPS OF GENERAL CONSTRAINT FLAGS," filed on May 22, 2020, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar MV derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1C, a current block (111) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (112 through 116, respectively). In H.265, the MV prediction can use predictors from the same reference picture that the neighboring block is using.

SUMMARY

Aspects of the disclosure provide apparatuses for video encoding/decoding. An apparatus includes processing circuitry that decodes profile information for a plurality of image slices in prediction information of a coded video bitstream. The profile information includes profile identification information of a profile in which each of the image slices in the coded video bitstream is intra coded. The processing circuitry performs intra prediction on each of the image slices in the coded video bitstream. The processing circuitry reconstructs at least one image picture based on the intra prediction.

In an embodiment, the profile information includes a first flag indicating whether each of the image slices in the coded video bitstream is intra coded and a second flag indicating whether each of the image slices in the coded video bitstream is included in one picture.

In an embodiment, the first flag is decoded after the second flag and indicates that each of the image slices in the coded video bitstream is intra coded based on the second flag indicating that each of the image slices in the coded video bitstream is included in one picture.

In an embodiment, the first flag indicates that each of the image slices in the coded video bitstream is intra coded based on the profile identification information of the profile in which each of the images slice in the coded video bitstream is intra coded.

In an embodiment, the second flag indicates that each of the image slices in the coded video bitstream is included in one picture based on the profile being a still picture profile in which only one picture is included in the coded video bitstream.

In an embodiment, non-intra related syntax elements are not included in the prediction information based on one of (i) the first flag indicating that each of the image slices in the coded video bitstream is intra coded and (ii) the second flag indicating that each of the image slices in the coded video bitstream is included in one picture.

In an embodiment, the prediction information includes a third flag indicating whether each of the image slices in the coded video bitstream is intra coded and included in one picture. The third flag is not included in the profile information.

In an embodiment, the third flag indicates that each of the image slices in the coded video bitstream is intra coded and included in one picture based on the second flag indicating that each of the image slices in the coded video bitstream is included in one picture.

Aspects of the disclosure provide methods for video encoding/decoding. In the method, profile information for a plurality of image slices in prediction information of a coded video bitstream is decoded. The profile information includes profile identification information of a profile in which each of the image slices in the coded video bitstream is intra coded. Intra prediction on each of the image slices in the coded video bitstream is performed. At least one image picture is reconstructed based on the intra prediction.

Aspects of the disclosure provide apparatuses for video encoding/decoding. An apparatus includes processing circuitry that decodes profile information in prediction information of a coded video bitstream. The profile information includes a plurality of groups of syntax elements and indicates a profile for the coded video bitstream. The processing circuitry determines at least one of the plurality of groups of syntax elements based on the profile indicated in the profile information. The processing circuitry decodes syntax elements included in the prediction information based on the determined at least one of the plurality of groups of syntax elements. The processing circuitry reconstructs at least one picture based on the decoded syntax elements included in the prediction information.

In an embodiment, an order of the determined at least one of the plurality of groups of syntax elements for the profile is in accordance with a predetermined order of the plurality of groups of syntax elements in the profile information.

In an embodiment, byte alignment is checked for each of the plurality of groups of syntax elements in the profile information.

Aspects of the disclosure provide methods for video encoding/decoding. In the method, profile information in prediction information of a coded video bitstream is decoded. The profile information includes a plurality of groups of syntax elements and indicates a profile for the coded video bitstream. At least one of the plurality of groups of syntax elements is determined based on the profile indicated in the profile information. Syntax elements included in the prediction information are decoded based on the determined at least one of the plurality of groups of syntax elements. At least one picture is reconstructed based on the decoded syntax elements in the prediction information.

Aspects of the disclosure also provide non-transitory computer-readable mediums storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 2 is a schematic illustration of a simplified block diagram of a communication system in accordance with an embodiment;

DETAILED DESCRIPTION OF EMBODIMENTS

I. Video Decoder and Encoder Systems

Figure 1A:
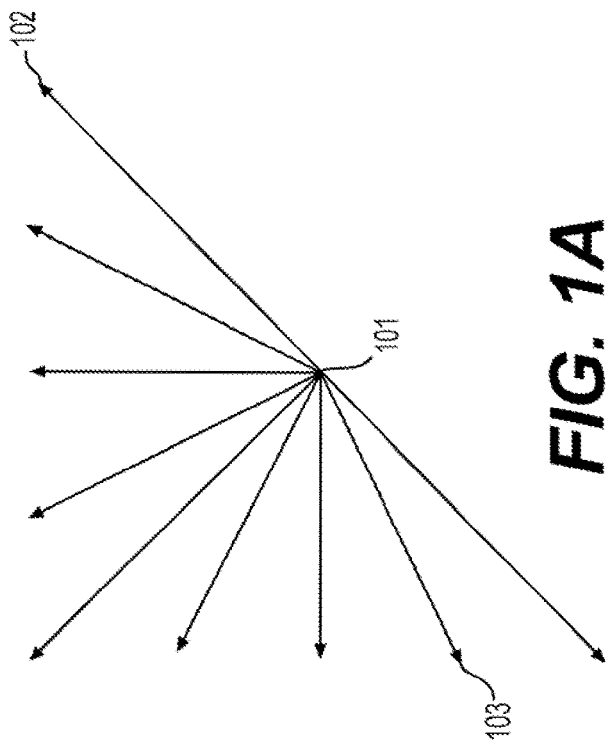
FIG. 1A is a schematic illustration of an exemplary subset of intra prediction modes.
Figure 1B:
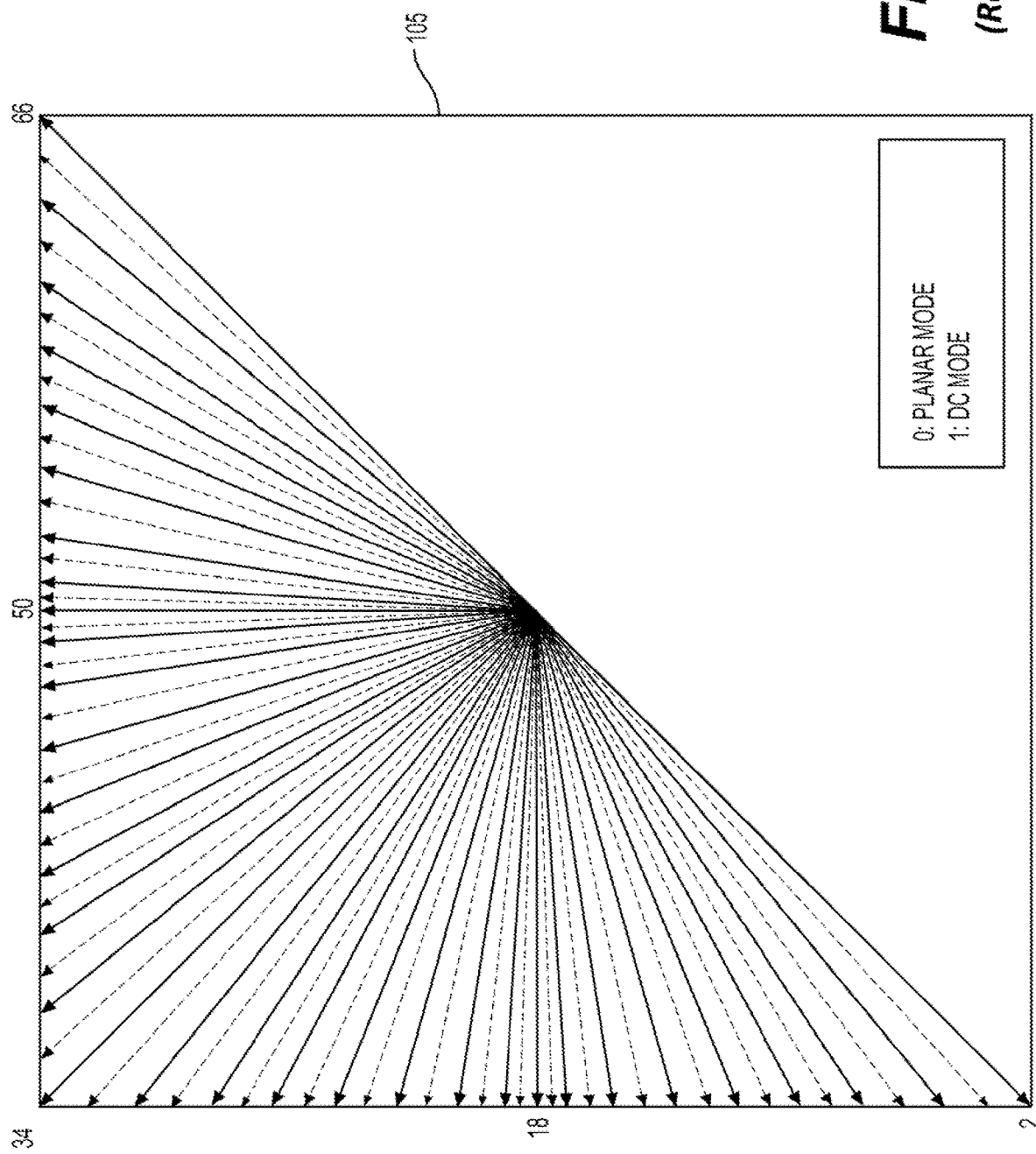
FIG. 1B is an illustration of exemplary intra prediction directions.
Figure 1C:
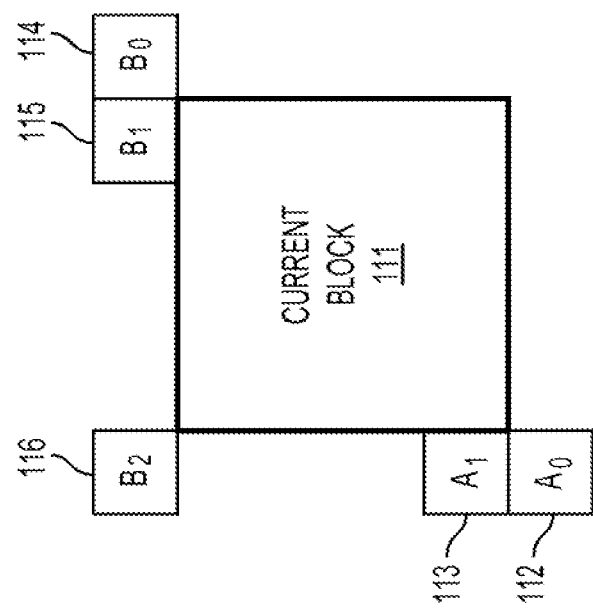
FIG. 1C is a schematic illustration of a current block and its surrounding spatial merge candidates in one example.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
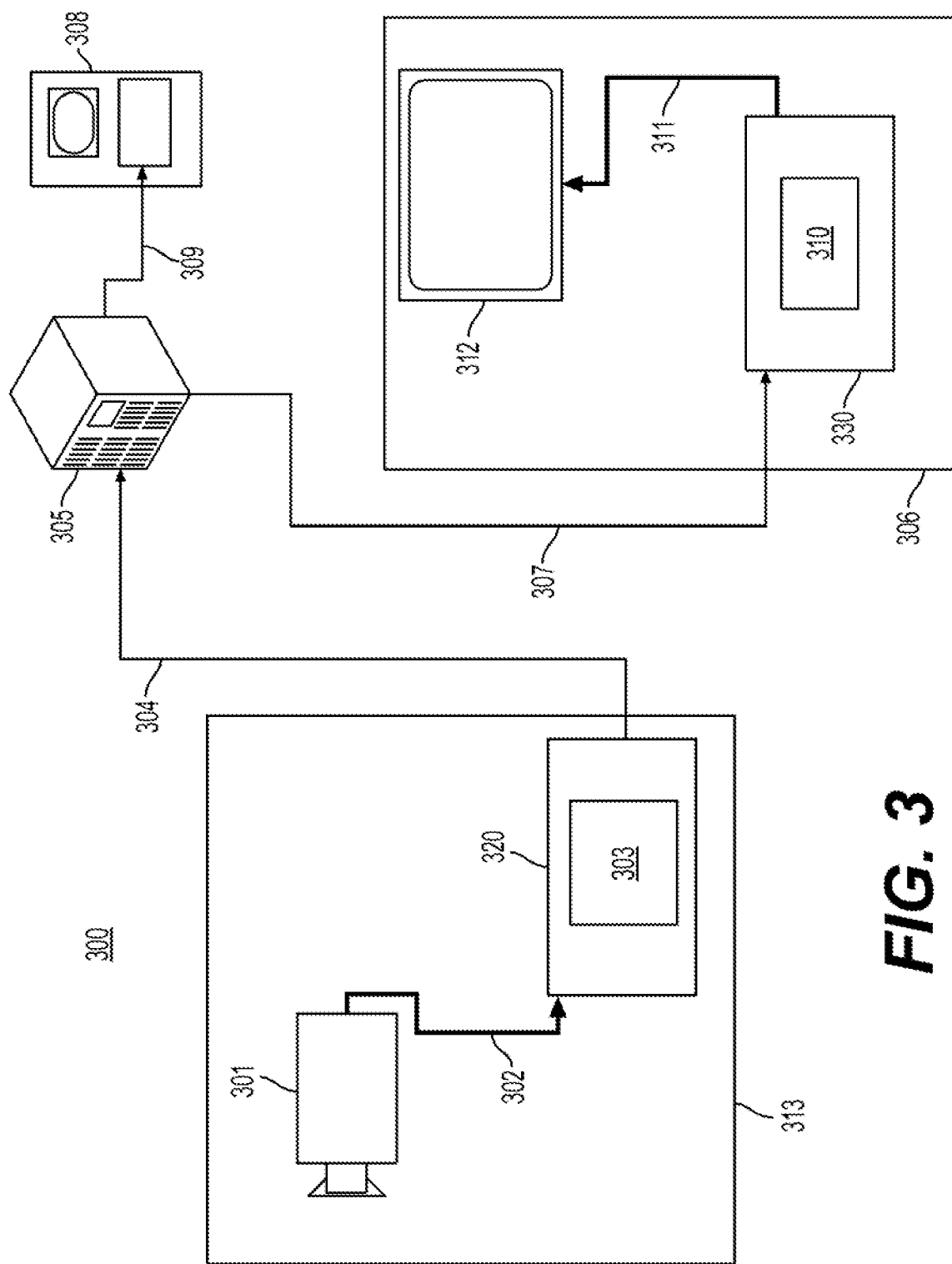
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
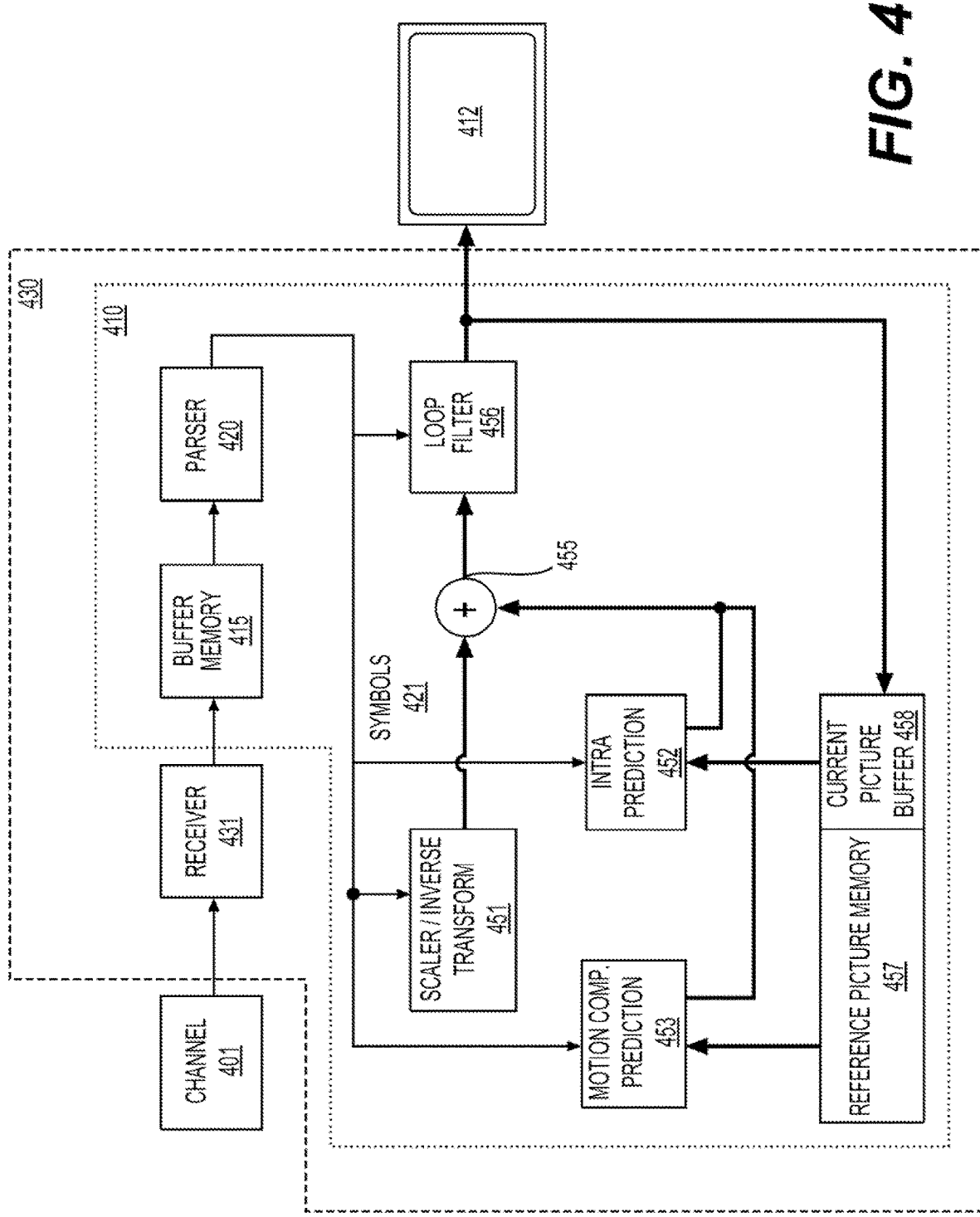
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, MVs, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by MVs, available to the motion compensation prediction unit (453) in the form of symbols (421) that can have, for example X, Y, and reference picture components. Motion compensation also can include interpolation of sample values as fetched from the reference picture memory (457) when sub-sample exact MVs are in use, MV prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
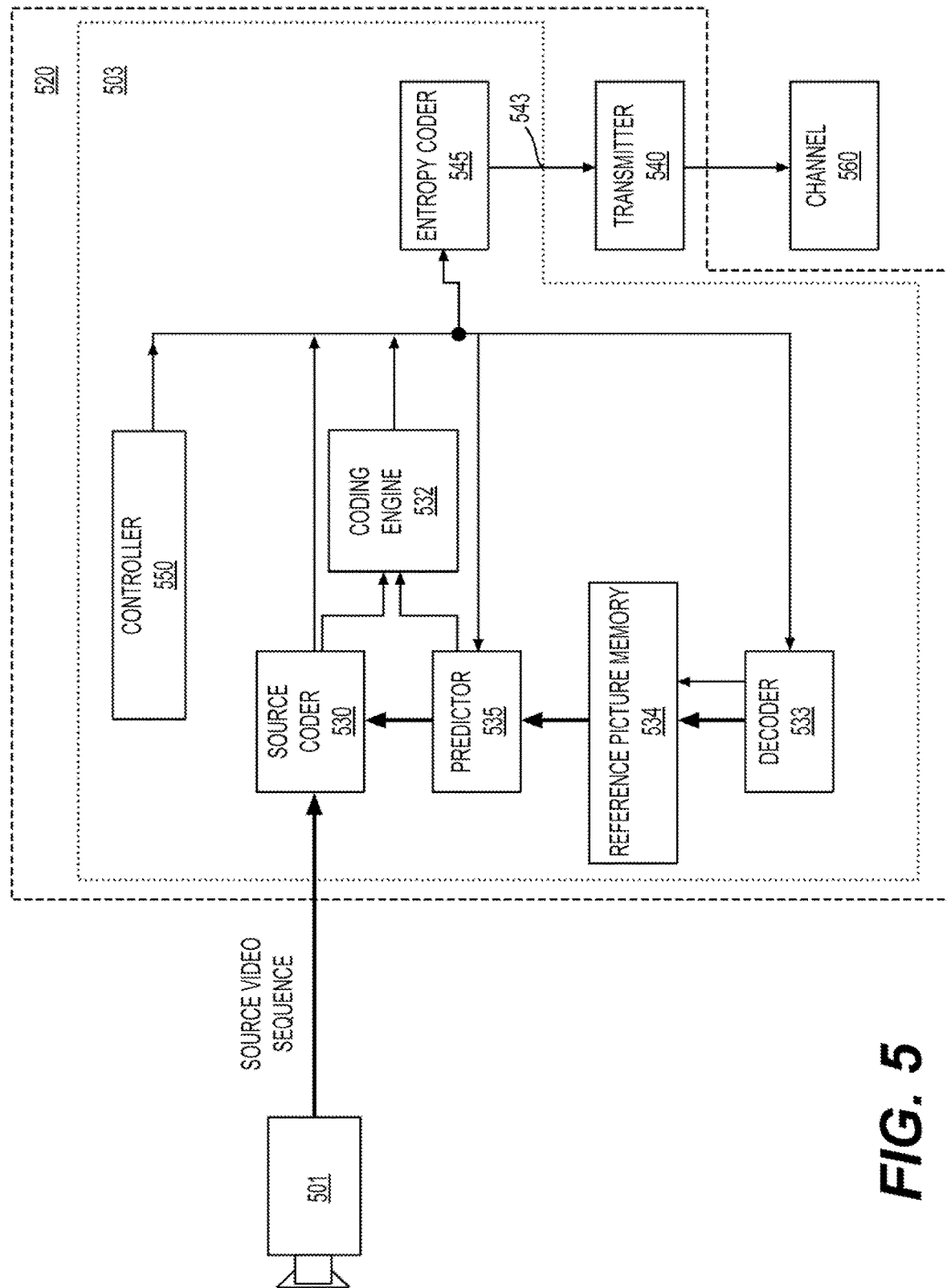
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum MV allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture MVs, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one MV and reference index to predict the sample values of each block.

A bi-directionally predictive picture (B Picture) may be one that may be coded and decoded using intra prediction or inter prediction using at most two MVs and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a MV. The MV points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first MV that points to a first reference block in the first reference picture, and a second MV that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
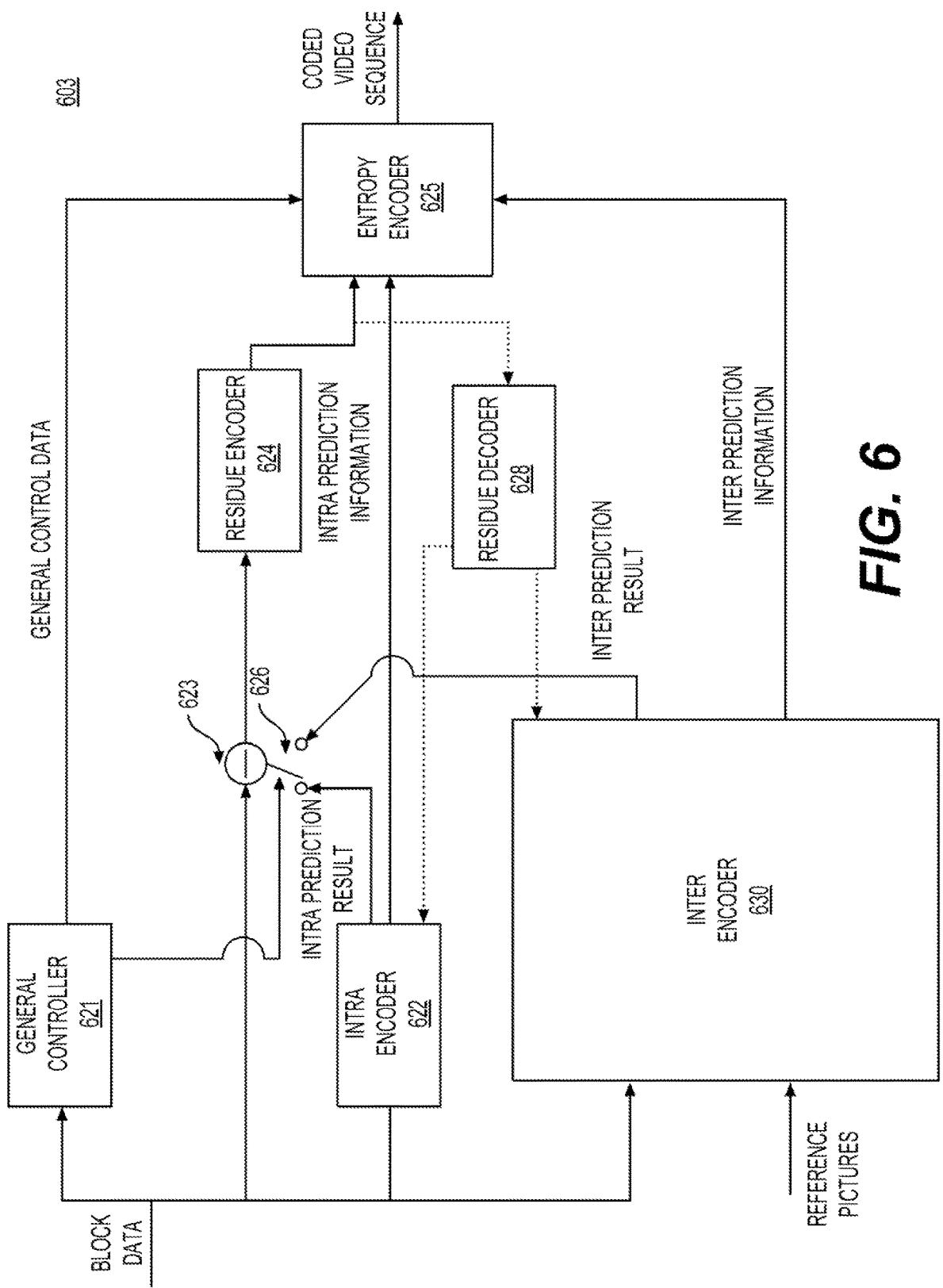
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the MV is derived from one or more MV predictors without the benefit of a coded MV component outside the predictors. In certain other video coding technologies, a MV component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, MVs, merge mode information), and calculate inter prediction results (e.g., prediction block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., prediction block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard such as HEVC. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
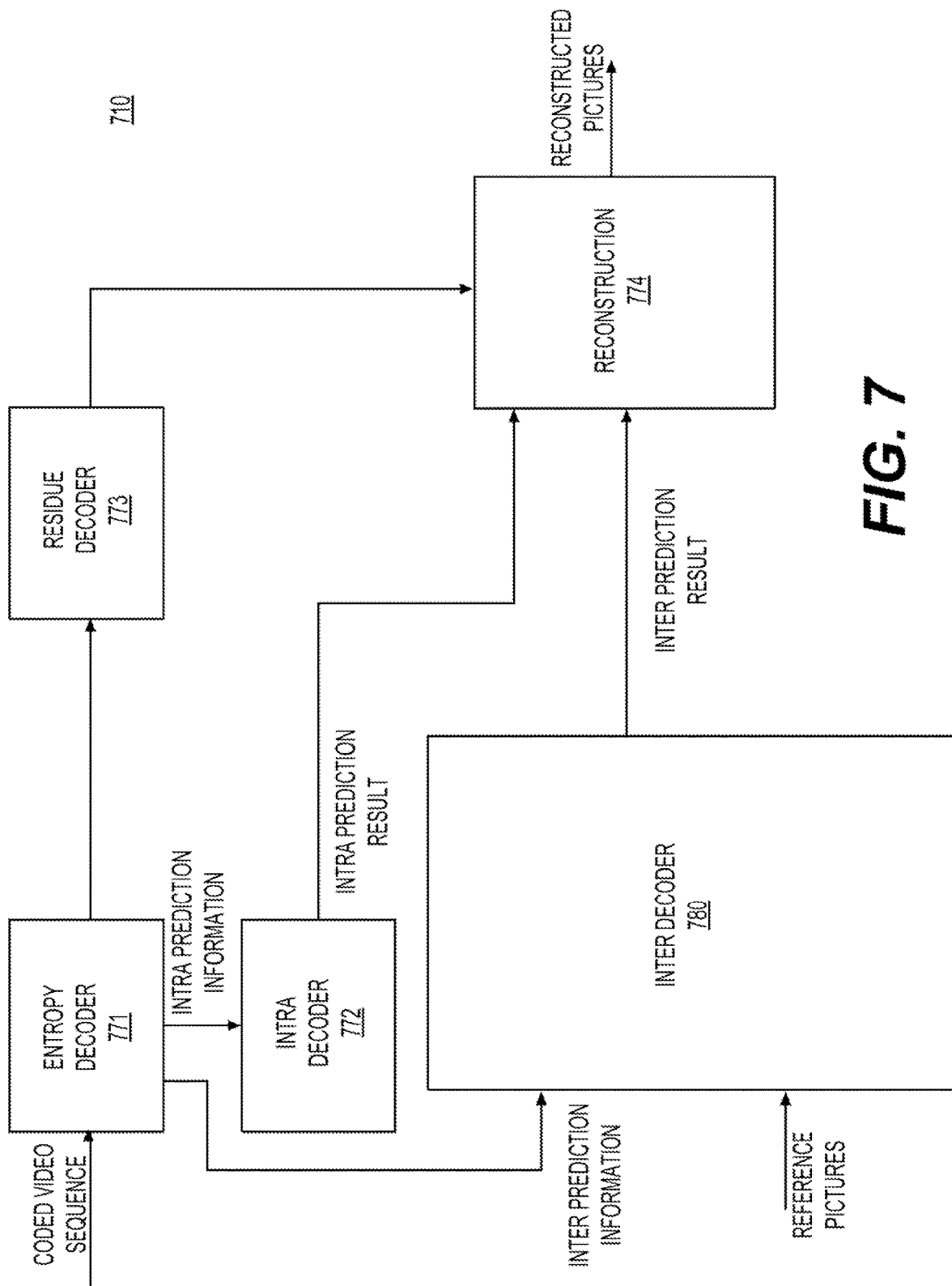
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. Exemplary High Level Syntax Elements

Table 1 shows exemplary sequence parameter set (SPS) syntax elements in some related examples such as VVC. Both syntax elements related to intra coding and inter coding are included in Table 1. It is noted that for an intra profile which only includes intra slices, inter coding syntax elements may be present in the SPS but are not used in a decoding process of the intra profile. The situation also applies to any still picture profile. That is, for a still picture profile which only includes intra slice(s), inter coding syntax elements are not used in a decoding process of the still profile.

TABLE 1

Sequence parameter set raw byte sequence payload (RBSP) syntax

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag ) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for( i = 0; i <= sps_num_subpics_minus1; i++ ) | |

TABLE 1-continued

Sequence parameter set raw byte sequence payload (RBSP) syntax

| | Descriptor |
|---|---|
|     sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, ps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |

TABLE 1-continued

Sequence parameter set raw byte sequence payload (RBSP) syntax

| | Descriptor |
|---|---|
|     log2_transform_skip_max_size_minus2 | ue(v) |
|     sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| if( sps_bdof_enabled_flag ) | |
|     sps_bdof_pic_present_flag | u(1) |
| sps_smvd_enabled_flag | u(1) |
| sps_dmvr_enabled_flag | u(1) |
| if( sps_dmvr_enabled_flag ) | |
|     sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|     sps_cclm_enabled_flag | u(1) |
| if( chroma_format_idc == 1 ) { | |
|     sps_chroma_horizontal_collocated_flag | u(1) |
|     sps_chroma_vertical_collocated_flag | u(1) |
| } | |
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|     five_minus_max_num_subblock_merge_cand | ue(v) |
|     sps_affine_type_flag | u(1) |
|     if( sps_amvr_enabled_flag ) | |
|         sps_affine_amvr_enabled_flag | u(1) |
|     sps_affine_prof_enabled flag | u(1) |
|     if( sps_affine_prof_enabled_flag ) | |
|         sps_prof_pic_present_flag | u(1) |
| } | |
| sps_palette_enabled_flag | u(1) |
| if( ChromaArrayType == 3 && !sps_max_luma_transform_size_64_flag ) | |
|     sps_act_enabled_flag | u(1) |
| if( sps_transform_skip_enabled_flag \|\| sps_palette_enabled_flag ) | |
|     min_qp_prime_ts_minus4 | ue(v) |
| sps_bcw_enabled_flag | u(1) |
| sps_ibc_enabled_flag | u(1) |
| if( sps_ibc_enabled_flag ) | |
|     six_minus_max_num_ibc_merge_cand | ue(v) |
| sps_ciip_enabled_flag | u(1) |
| if( sps_mmvd_enabled_flag ) | |
|     sps_fpel_mmvd_enabled_flag | u(1) |
| if( MaxNumMergeCand >= 2 ) { | |
|     sps_gpm_enabled_flag | u(1) |
|     if( sps_gpm_enabled_flag && MaxNumMergeCand >= 3 ) | |
|         max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
| } | |
| log2_parallel_merge_level_minus2 | ue(v) |
| sps_explicit_scaling_list_enabled_flag | u(1) |
| sps_dep_quant_enabled_flag | u(1) |
| if( !sps_dep_quant_enabled_flag ) | |

TABLE 1-continued

Sequence parameter set raw byte sequence payload (RBSP) syntax

| | Descriptor |
|---|---|
| sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

Table 2 shows exemplary picture parameter set (PPS) syntax elements in some related examples such as VVC. Both syntax elements related to intra coding and inter coding are included in Table 2. It is noted that for an intra profile which only includes intra slices, inter coding syntax elements may be present in the PPS but are not used in a decoding process of the intra profile. The situation also applies to any still picture profile. That is, for a still picture profile which only includes intra slice(s), inter coding syntax elements are not used in a decoding process of the still profile.

TABLE 2

Picture parameter RBSP syntax

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |

TABLE 2-continued

Picture parameter RBSP syntax

| | Descriptor |
|---|---|
|     scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
|   pps_num_subpics_minus1 | ue(v) |
|   pps_subpic_id_len_minus1 | ue(v) |
|   for( i = 0; i <= pps_num_subpic_minus1; i++ ) | |
|     pps_subpic_id[ i ] | u(v) |
| } | |
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 1 ) | |
|     rect_slice_flag | u(1) |
|   if( rect_slice_flag ) | |
|     single_slice_per_subpic_flag | u(1) |
|   if( rect_slice_flag && !single_slice_per_subpic_flag ) { | |
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1[ i ] | ue(v) |
|       if( NumTileRows > 1 && ( tile_idx_delta_present_flag || | |
|         SliceTopLeftTileIdx[ i ] % NumTileColumns = = 0 ) ) | |
|         slice_height_in_tiles_minus1[ i ] | ue(v) |
|       if( slice_width_in_tiles_minus1[ i ] = = 0 && | |
|         slice_height_in_tiles_minus1[ i ] = = 0 && | |
|         RowHeight[ SliceTopLeftTileIdx[ i ] / NumTileColumns ] > 1 ) { | |
|         num_exp_slices_in_tile[ i ] | ue(v) |
|         for( j = 0; j < num_exp_slices_in_tile[ i ]; j++ ) | |
|           exp_slice_height_in_ctus_minus1[ i ][ j ] | ue(v) |
|         i += NumSlicesInTile[ i ] − 1 | |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |

TABLE 2-continued

Picture parameter RBSP syntax

| | Descriptor |
|---|---|
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag \| \| pps_weighted_bipred_flag ) && rpl_info_in_ph_flag ) | |
|   wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

Table 3 and Table 4 show exemplary picture header (PH) syntax elements in some related examples such as VVC. A picture may include a combination of intra and inter slices. When a picture includes only intra slices, inter coding syntax elements may be present in the PH but are not used in a decoding process of the picture. To reduce overhead in a picture, in some examples, ph_inter_slice_allowed_flag and ph_intra_slice_allowed_flag in Table 4 are used to conditionally signal intra coding related syntax elements and inter coding related syntax elements.

TABLE 3

Picture header RBSP syntax

| | Descriptor |
|---|---|
| picture_header_rbsp( ) { | |
|   picture_header_structure( ) | |
|   rbsp_trailing_bits( ) | |
| } | |

TABLE 4

Picture header structure

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |

TABLE 4-continued

| Picture header structure | Descriptor |
|---|---|
| ```
          poc_msb_val
    }
    if( sps_alf_enabled_flag && alf_info_in_ph_flag ) {
      ph_alf_enabled_flag
      if( ph_alf_enabled_flag ) {
        ph_num_alf_aps_ids_luma
        for( i = 0; i < ph_num_alf_aps_ids_luma; i++ )
          ph_alf_aps_id_luma[ i ]
        if( ChromaArrayType != 0 )
          ph_alf_chroma_idc
        if( ph_alf_chroma_idc > 0 )
          ph_alf_aps_id_chroma
        if( sps_ccalf_enabled_flag ) {
          ph_cc_alf_cb_enabled_flag
          if( ph_ccalf_cb_enabled_flag )
            ph_cc_alf_cb_aps_id
          ph_cc_alf_cr_enabled_flag
          if( ph_cc_alf_cr_enabled_flag )
            ph_cc_alf_cr_aps_id
        }
      }
    }
    if( sps_lmcs_enabled_flag ) {
      ph_lmcs_enabled_flag
      if( ph_lmcs_enabled_flag ) {
        ph_lmcs_aps_id
        if( ChromaArrayType != 0 )
          ph_chroma_residual_scale_flag
      }
    }
    if( sps_explicit_scaling_list_enabled_flag ) {
      ph_explicit_scaling_list_enabled_flag
      if( ph_explicit_scaling_list_enabled_flag )
        ph_scaling_list_aps_id
    }
    if( sps_virtual_boundaries_enabled_flag && !sps_virtual_boundaries_present_flag ) {
      ph_virtual_boundaries_present_flag
      if( ph_virtual_boundaries_present_flag ) {
        ph_num_ver_virtual_boundaries
        for( i = 0; i < ph_num_ver_virtual_boundaries; i++ )
          ph_virtual_boundaries_pos_x[ i ]
        ph_num_hor_virtual_boundaries
        for( i = 0; i < ph_num_hor_virtual_boundaries; i++ )
          ph_virtual_boundaries_pos_y[ i ]
      }
    }
    if( output_flag_present_flag )
      pic_output_flag
    if( rpl_info_in_ph_flag )
      ref_pic_lists( )
    if( partition_constraints_override_enabled_flag )
      partition_constraints_override_flag
    if( ph_intra_slice_allowed_flag ) {
      if( partition_constraints_override_flag ) {
        ph_log2_diff_min_qt_min_cb_intra_slice_luma
        ph_max_mtt_hierarchy_depth_intra_slice_luma
        if( ph_max_mtt_hierarchy_depth_intra_slice_luma != 0 ) {
          ph_log2_diff_max_bt_min_qt_intra_slice_luma
          ph_log2_diff_max_tt_min_qt_intra_slice_luma
        }
        if( qtbtt_dual_tree_intra_flag ) {
          ph_log2_diff_min_qt_min_cb_intra_slice_chroma
          ph_max_mtt_hierarchy_depth_intra_slice_chroma
          if( ph_max_mtt_hierarchy_depth_intra_slice_chroma != 0 ) {
            ph_log2_diff_max_bt_min_qt_intra_slice_chroma
            ph_log2_diff_max_tt_min_qt_intra_slice_chroma
          }
        }
      }
      if( cu_qp_delta_enabled_flag )
        ph_cu_qp_delta_subdiv_intra_slice
      if( pps_cu_chroma_qp_offset_list_enabled_flag )
        ph_cu_chroma_qp_offset_subdiv_intra_slice
    }
    if( ph_inter_slice_allowed_flag ) {
      if( partition_constraints_override_flag ) {
``` | u(v)<br><br>u(1)<br><br>u(3)<br><br>u(3)<br><br>u(2)<br><br>u(3)<br><br>u(1)<br><br>u(3)<br>u(1)<br><br>u(3)<br><br><br><br><br>u(1)<br><br>u(2)<br><br>u(1)<br><br><br><br>u(1)<br><br>u(3)<br><br>u(1)<br><br>u(2)<br><br>u(13)<br>u(2)<br><br>u(13)<br><br><br><br>u(1)<br><br><br>u(1)<br><br>ue(v)<br>ue(v)<br><br>ue(v)<br>ue(v)<br><br>ue(v)<br>ue(v)<br><br>ue(v)<br>ue(v)<br><br><br><br>ue(v)<br><br>ue(v)<br> |

TABLE 4-continued

| Picture header structure | |
|---|---|
| | Descriptor |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|         ph_log2_diff_max_bt_min_qt_inter_slice | ue(v) |
|         ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|         ph_collocated_from_l0_flag | u(1) |
|         if( ( ph_collocated_from_l0_flag && | |
|             num_ref_entries[ 0 ][ RplsIdx[ 0 ] ] > 1 ) \|\| | |
|             ( !ph_collocated_from_l0_flag && | |
|             num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| } | |

III. Exemplary Profile Information

Table 5 shows exemplary profile information in some related examples such as VVC. The profile information may present in profile_tier_level( ) in SPS and include general constraint information general constraint info( ) as shown in Table 5.

Table 6 shows exemplary general constraint information in some related examples such as VVC. A first flag such as an intra only constraint flag (e.g., intra_only_constraint_flag in Table 6) in the general constraint information can be used to indicate whether a slice type of an image slice conforming to a profile is intra slice. The first flag equal to 1 specifies that the slice type of the image slice conforming to the profile is intra slice (slice_type=I slice). The first flag equal to 0 does not impose such a constraint.

TABLE 5

Profile information in SPS

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   ... | |
| } | |

TABLE 6

General constraint information in profile information

| | Descriptor |
|---|---|
| general_constraint_info( ) { | |
|   general_progressive_source_flag | u(1) |
|   general_interlaced_source_flag | u(1) |
|   general_non_packed_constraint_flag | u(1) |
|   general_frame_only_constraint_flag | u(1) |
|   general_non_projected_constraint_flag | u(1) |
|   intra_only_constraint_flag | u(1) |
|   ... | |
| } | |

Bitstreams conforming to a Main 10 profile may obey the following constraints: (i) referenced SPSs have chroma_format_idc equal to 0 or 1; (ii) referenced SPSs have bit_depth_minus8 in the range of 0 to 2, inclusive; (iii) referenced SPSs have sps_palette_enabled_flag equal to 0; (iv) general_level_idc and sublayer_level_idc[i] for all values of i in a view parameter set (VPS) (when available) and in the referenced SPSs are not be equal to 255 (which indicates level 8.5); and (v) the tier and level constraints specified for the Main 10 profile in VVC, as applicable, can be fulfilled.

Conformance of a bitstream to the Main 10 profile is indicated by general_profile_idc being equal to 1. A decoder conforming to the Main 10 profile at a specific level of a specific tier is capable of decoding all bitstreams for which all of the following conditions apply: (i) the bitstream is indicated to conform to the Main 10 profile; (ii) the bitstream is indicated to conform to a tier that is lower than or equal to the specified tier; and (iii) the bitstream is indicated to conform to a level that is not level 8.5 and is lower than or equal to the specified level.

Bitstreams conforming to a Main 4:4:4 10 profile may obey the following constraints: (i) referenced SPSs have chroma_format_idc in the range of 0 to 3, inclusive; (ii) referenced SPSs have bit depth minus8 in the range of 0 to 2, inclusive; (iii) general_level_idc and sublayer_level_idc [i] for all values of i in a VPS (when available) and in the referenced SPSs are be equal to 255 (which indicates level 8.5); and (iv) the tier and level constraints specified for the Main 4:4:4 10 profile in VVC, as applicable, can be fulfilled.

Conformance of a bitstream to the Main 4:4:4 10 profile is indicated by general_profile_idc being equal to 2. A decoder conforming to the Main 4:4:4 10 profile at a specific level of a specific tier is capable of decoding all bitstreams for which all of the following conditions apply: (i) the bitstream is indicated to conform to the Main 4:4:4 10 or Main 10 profile; (ii) the bitstream is indicated to conform to a tier that is lower than or equal to the specified tier; and (iii) the bitstream is indicated to conform to a level that is not level 8.5 and is lower than or equal to the specified level.

IV. Profile Information for Video Sequence Including Only Intra Slices

In some related examples, an SPS-level flag (e.g., sps_inter_allowed_flag) can be used to indicate that only intra slices are included in a coded video sequence or bitstream. The flag can be used to skip signaling of inter coding related syntax elements to reduce redundancy. For example, when sps_inter_allowed_flag equals to 1, inter coding related syntax elements can exist in the SPS. When sps_inter_allowed_flag equals to 0, only intra coding related syntax elements can exist in the SPS.

Additionally, in some related examples, a PPS-level flag (e.g., pps_inter_allowed_flag) can be used to indicate that only intra slices are included in a coded video sequence. The flag can be used to skip signaling of inter coding related syntax elements to reduce redundancy. For example, when pps_inter_allowed_flag equals to 1, inter coding related syntax elements can exist in the PPS. When pps_inter_allowed_flag equals to 0, only intra coding related syntax elements can exist in the PPS.

This disclosure includes methods for using profile information to indicate when only intra slices are included in a coded video sequence.

According to aspects of the disclosure, an all intra profile can be used to indicate that only intra slices are included in the coded video sequence. In the all intra profile, all slices conforming to this profile are intra coded. The all intra profile can be indicated by profile information such as profile identification information (e.g., general_profile_idc in Table 5).

A still picture profile can be used to indicate that only intra slices are included in the coded video sequence. In the still picture profile, all slices conforming to this profile are intra coded. The still picture can be indicated by profile information such as profile identification information (e.g., general profile idc). The still picture profile can be used for still photography captured by cameras, computer generated images, extraction of snapshots from video sequences, and the like. The still picture profile can have a subset of the capabilities of the Main 10 profile described above.

In an embodiment, for a still picture profile, a second flag such as a one picture only constraint flag (e.g., one_picture_only_constraint_flag in Table 7) can be included in profile information. The one picture only constraint flag can indicate whether all slices are intra coded and there is only one picture in the coded video sequence. In an example, the one picture only constraint flag equal to 1 specifies that all slices conforming to the still picture profile in the coded video sequence are intra coded (e.g., slice_type=I slice) and there is only one picture in the coded video sequence. The one picture only constraint flag equal to 0 does not impose such a constraint.

In an embodiment, the one picture only constraint flag is signaled in general constraint information (e.g., general_constraint_info( )) in profile information (e.g., profile_tier_level( )). Table 7 provides an example of the general constraint information including the one picture only constraint flag. As described above, the general constraint information in Table 7 can be included in profile information such as profile_tier_level( ) in Table 5.

TABLE 7

General constraint information including
one picture only constraint flag

| | Descriptor |
|---|---|
| General_constraint_info( ) { | |
| general_progressive_source_flag | u(1) |
| general_interlaced_source_flag | u(1) |
| general_non_packed_constraint_flag | u(1) |
| general_frame_only_constraint_flag | u(1) |
| general_non_projected_constraint_flag | u(1) |
| one_picture_only_constraint_flag | u(1) |
| intra_only_constraint_flag | u(1) |
| ... | |
| } | |

According to aspects of the disclosure, one or more constraints can be applied between the first and second flags, such as the intra only constraint flag and the one picture only constraint flag in the bitstream conformance.

In an embodiment, as shown in Table 7, the one picture only constraint flag is signaled before the intra only constraint flag. When the one picture only constraint flag indicates that all slices conforming to the still picture profile in the coded video sequence are intra coded and included in one picture (e.g., one_picture_only_constraint_flag=1 in Table 7), the intra only constraint flag can be set to indicate that a slice type of a slice conforming to the still picture profile is intra slice (e.g., intra_only_constraint_flag=1 in Table 7) based on the bitstream conformance.

In an embodiment, the one picture only constraint flag equal to 1 specifies that a slice type of a slice conforming to the still picture profile is intra slice (e.g., slice_type=I slice) and there is only one picture in the bitstream. The one picture only constraint flag equal to 0 does not impose such a constraint. The intra only constraint flag equal to 1 specifies that a slice type of a slice is intra slice (slice_type=I slice). The intra only constraint flag equal to 0 does not impose such a constraint. Based on the bitstream conformance, when the one picture only constraint flag is true, the intra only constraint flag is also true.

In an embodiment, when the one picture only constraint flag is equal to 1, the only one picture in the coded video sequence can be an intra random access picture (IRAP), such as an instantaneous decoding refresh (IDR) picture or a clean random access (CRA) picture.

In an embodiment, when the one picture only constraint flag is equal to 1, video parameter set (VPS) may not present and a number of layers of the coded video sequence may be equal to 1.

In an embodiment, when the one picture only constraint flag is equal to 1, a reference picture list (RPL) and a picture order count (POC) may not present in the picture header or slice header.

In an embodiment, when the one picture only constraint flag is equal to 1, an access unit delimiter (AUD) and an end of stream (EOS) network abstraction layer (NAL) units may not be present in the bitstream.

In an embodiment, for an all intra profile, the intra only constraint flag indicates that all the slices conforming to this profile are only intra coded, for example when the intra only constraint flag is set to 1. Therefore, in the all intra profile, only intra slices can exist in the bitstream.

In an embodiment, for a still picture profile, both of the one picture only constraint flag and the intra only constraint flag can be set as 1, indicating only intra slices can exist in the bitstream and only one picture can exist in the bitstream.

In an embodiment, for a still picture profile, the one picture only constraint flag can be set as 1, indicating only intra slices can exist in the bitstream and only one picture can exist in the bitstream.

According to aspects of the disclosure, one or more non-intra related syntax elements may be excluded based on the intra only constraint flag. For example, when the intra only constraint flag is present and indicates that all slices in the bitstream are intra coded, for example when the intra only constraint flag equals to 1, non-intra related syntax elements are not signaled.

In an embodiment, when the intra only constraint flag is present and indicates that all slices in the bitstream are intra coded, for example when the intra only constraint flag equals to 1, one or more flags may be set to 0. For example, both sps_inter_allowed_flag and pps_inter_allowed_flag described above can be set as 0. When the intra only constraint flag is not present or equals to 0, such a constraint does not apply to the one or more flags, such as sps_inter_allowed_flag and pps_inter_allowed_flag.

According to aspects of the disclosure, one or more non-intra related syntax elements may be excluded based on the one picture only constraint flag. For example, when the one picture only constraint flag is present and indicates that all slices in the bitstream are intra coded and only one picture exists in the bitstream, for example when the one picture only constraint flag equals to 1, non-intra related syntax elements are not signaled.

In an embodiment, when the one picture only constraint flag is present and indicates that all slices in the bitstream are intra coded and only one picture exists in the bitstream, for example when the one picture only constraint flag equals to 1, one or more flag may be set to 0. For example, both sps_inter_allowed_flag and pps_inter_allowed_flag described above can be set as 0. When the one picture only constraint flag is not present or equals to 0, such a constraint does not apply to the one or more flags, such a sps_inter_allowed_flag and pps_inter_allowed_flag.

According to aspects of the disclosure, a third flag can be used to indicate that all slices in the coded video sequence are intra coded and included in one picture. The third flag can be an SPS only one picture present flag and signaled separately from the profile information. For example, the SPS only one picture present flag can be signaled in SPS. The SPS only one picture present flag equal to 1 specifies that a slice type of a slice in the coded video sequence is intra slice (slice_type=I slice) and there is only one picture in the sequence. The SPS only one picture present flag equal to 0 does not impose such a constraint.

In an embodiment, one or more syntax elements may be excluded based on the one picture only constraint flag. For example, when the one picture only constraint flag is present and indicates that all slices in the bitstream are intra coded and only one picture exists in the bitstream, for example when the one picture only constraint flag equals to 1, non-intra related syntax elements and/or syntax elements regarding POC value and RPL are not signaled.

In an embodiment, when the one picture only constraint flag is present and equals to 1, the SPS only one picture present flag can be set as the same value as the one picture only constraint flag based on the bitstream conformance.

Table 8 shows some exemplary syntax elements in the general constraint information including both the one picture constraint flag and the intra only constraint flag. As described above, the general constraint information in Table 8 can be included in profile information such as profile_tier_level( ) in Table 5. In Table 8, the one picture constraint flag is general_one_picture_only_constraint_flag. general_one_picture_only_constraint_flag equal to 1 specifies that there is only one coded picture in the bitstream, and general_one_picture_only_constraint_flag equal to 0 does not impose such a constraint. In addition, the intra only constraint flag is intra_only_constraint_flag. intra_only_constraint_flag equal to 1 specifies that slice type in the slice header is intra slice (sh_slice_type=I), and intra_only_constraint_flag equal to 0 does not impose such a constraint. When general_one_picture_only_constraint_flag is equal to 1, the value of intra_only_constraint_flag can be set as 1.

TABLE 8

General constraint information syntax

| | Descriptor |
|---|---|
| general_constraint_info( ) { | |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
|   intra_only_constraint_flag | u(1) |
|   max_bitdepth_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_mrl_constraint_flag | u(1) |
|   no_isp_constraint_flag | u(1) |
|   no_mip_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_lfnst_constraint_flag | u(1) |
|   no_affine_motion_constraint_flag | u(1) |
|   no_mmvd_constraint_flag | u(1) |
|   no_smvd_constraint_flag | u(1) |
|   no_prof_constraint_flag | u(1) |
|   no_bcw_constraint_flag | u(1) |
|   no_ibc_constraint_flag | u(1) |
|   no_ciip_constraint_flag | u(1) |
|   no_gpm_constraint_flag | u(1) |
|   no_ladf_constraint_flag | u(1) |
|   no_transform_skip_constraint_flag | u(1) |

TABLE 8-continued

General constraint information syntax

| | Descriptor |
|---|---|
|   no_bdpcm_constraint_flag | u(1) |
|   no_palette_constraint_flag | u(1) |
|   no_act_constraint_flag | u(1) |
|   no_lmcs_constraint_flag | u(1) |
|   no_cu_qp_delta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   no_tsrc_constraint_flag | u(1) |
|   no_mixed_nalu_types_in_pic_constraint_flag | u(1) |
|   no_trail_constraint_flag | u(1) |
|   no_stsa_constraint_flag | u(1) |
|   no_rasl_constraint_flag | u(1) |
|   no_radl_constraint_flag | u(1) |
|   no_idr_constraint_flag | u(1) |
|   no_cra_constraint_flag | u(1) |
|   no_gdr_constraint_flag | u(1) |
|   no_aps_constraint_flag | u(1) |
|   while( !byte_aligned( ) ) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | |

According to aspects of the disclosure, bitstreams conforming to the Main 10 or Main 10 Still Picture profile can obey the following constraints: (i) in a bitstream conforming to the Main 10 Still Picture profile, the bitstream contains only one picture; (ii) referenced SPSs have sps_chroma_format_idc equal to 0 or 1; (iii) referenced SPSs have sps_bit_depth_minus8 in the range of 0 to 2, inclusive; (iv) in a bitstream conforming to the Main 10 Still Picture profile, the referenced SPS have max_dec_pic_buffering_minus1 [sps_max_sublayers_minus1] equal to 0; (v) referenced SPSs have sps_palette_enabled_flag equal to 0; (vi) in a bitstream conforming to the Main 10 profile that do not conform to the Main 10 Still Picture profile, general_level_idc and sublayer_level_idc[i] for all values of i in the referenced VPS (when available) and in the referenced SPSs are not equal to 255 (which indicates level 15.5); and (vii) the tier and level constraints specified for the Main 10 or Main 10 Still Picture profile in VVC, as applicable, can be fulfilled.

Conformance of a bitstream to the Main 10 profile can be indicated by the profile identification information (e.g., general_profile_idc=1 in Table 5).

Conformance of a bitstream to the Main 10 Still Picture profile can be indicated by the one picture constraint flag (e.g., general_one_picture_only_constraint_flag=1 in Table 8) together with the profile identification information (e.g., general_profile_idc=1 in Table 5).

It is noted that when the conformance of a bitstream to the Main 10 Still Picture profile is indicated as specified above, and the indicated level is not level 15.5, the conditions for the indication of the conformance of the bitstream to the Main 10 profile are also fulfilled.

A decoder conforming to the Main 10 profile at a specific level of a specific tier is capable of decoding all bitstreams for which all of the following conditions apply: (i) the bitstream is indicated to conform to the Main 10 or Main 10 Still Picture profile; (ii) the bitstream is indicated to conform to a tier that is lower than or equal to the specified tier; and (iii) the bitstream is indicated to conform to a level that is not level 15.5 and is lower than or equal to the specified level.

A decoder conforming to the Main 10 Still Picture profile at a specific level of a specific tier is capable of decoding all bitstreams for which all of the following conditions apply: (i) the bitstream is indicated to conform to the Main 10 Still Picture profile; (ii) the bitstream is indicated to conform to a tier that is lower than or equal to the specified tier; and (iii) the bitstream is indicated to conform to a level that is not level 15.5 and is lower than or equal to the specified level.

According to aspects of the disclosure, bitstreams conforming to the Main 4:4:4 10 or Main 4:4:4 10 Still Picture profile can obey the following constraints: (i) in a bitstream conforming to the Main 4:4:4 10 Still Picture profile, the bitstream contains only one picture; (ii) referenced SPSs have sps_chroma_format_idc in the range of 0 to 3, inclusive; (iii) referenced SPSs have sps_bit_depth_minus8 in the range of 0 to 2, inclusive; (iv) in a bitstream conforming to the Main 4:4:4 10 Still Picture profile, the referenced SPS have max_dec_pic_buffering_minus1[sps_max_sublayers_minus] equal to 0; (v) in a bitstream conforming to the Main 4:4:4 10 profile that does not conform to the Main 4:4:4 10 Still Picture profile, general_level_idc and sublayer_level_idc[i] for all values of i in the referenced VPS (when available) and in the referenced SPSs are not equal to 255 (which indicates level 15.5); and (vi) the tier and level constraints specified for the Main 4:4:4 10 or Main 4:4:4 10 Still Picture profile in VVC, as applicable, can be fulfilled.

Conformance of a bitstream to the Main 4:4:4 10 profile is indicated by the profile identification information (e.g., general_profile_idc=2 in Table 5).

Conformance of a bitstream to the Main 4:4:4 10 Still Picture profile is indicated by the one picture constraint flag (e.g., general_one_picture_only_constraint_flag=1 in Table 8) together with the profile identification information (e.g., general_profile_idc=2 in Table 5).

It is noted that when the conformance of a bitstream to the Main 10 4:4:4 Still Picture profile is indicated as specified above, and the indicated level is not level 15.5, the conditions for the indication of the conformance of the bitstream to the Main 10 4:4:4 profile are also fulfilled.

A decoder conforming to the Main 4:4:4 10 profile at a specific level of a specific tier is capable of decoding all bitstreams for which all of the following conditions apply: (i) the bitstream is indicated to conform to the Main 4:4:4 10, Main 10, Main 4:4:4 10 Still Picture, or Main 10 Still Picture profile; (ii) the bitstream is indicated to conform to a tier that is lower than or equal to the specified tier; and (iii) the bitstream is indicated to conform to a level that is not level 15.5 and is lower than or equal to the specified level.

A decoder conforming to the Main 4:4:4 10 Still Picture profile at a specific level of a specific tier is capable of decoding all bitstreams for which all of the following conditions apply: (i) the bitstream is indicated to conform to the Main 4:4:4 10 Still Picture or Main 10 Still Picture profile; (ii) the bitstream is indicated to conform to a tier that is lower than or equal to the specified tier; and (iii) the bitstream is indicated to conform to a level that is not level 15.5 and is lower than or equal to the specified level.

V. Groups of General Constraint Flags

The general constraint information as described above can include a plurality of syntax elements (e.g., syntax elements in Table 8). However, a decoder may only need to decode a subset of the plurality of syntax elements to conform to a profile. This disclosure includes methods for grouping the plurality of syntax elements in the general constraint information. The grouping of the plurality of syntax elements can allow the decoder to terminate parsing of the general constraint information early, which can speed up the decoding process.

According to aspects of the disclosure, the plurality of syntax elements in the general constraint information can be grouped based on usage scenario such as profiles. A subgroup inside a group can also exist. Each group or subgroup of syntax elements includes a trunk of syntax elements which are present consecutively in the bitstream. Therefore, the decoder can terminate the parsing of the general constraint information early with the knowledge of the groups.

In some embodiments, the decoder can have the knowledge of a total number and an order of the groups of syntax elements included in the general constraint information.

In an embodiment, as shown in Table 9, the general constraint information includes three groups of syntax elements: non-intra-non-inter group (Group I), intra group (Group II), and inter group (Group III). For example, the intra group (Group II) includes a trunk of syntax elements related to intra coding tools, the inter group (Group III) includes a trunk of syntax elements related to inter coding tools, and the non-intra-non-inter group (Group I) includes a trunk of syntax elements related to neither of intra coding tools nor inter coding tools. In an example, the non-intra-non-inter group (Group I) is present in the bitstream first, then followed by the intra group (Group II), and the inter group (Group III) appears last.

As described above, the general constraint information in Table 9 can be included in profile information such as profile_tier_level( ) in Table 5.

TABLE 9

General constraint information including three groups of syntax elements

| | Descriptor |
|---|---|
| general_constraint_info( ) { | |
| //Group I: non-intra-non-inter group | |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
|   intra_only_constraint_flag | u(1) |
|   max_bitdepth_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_mts_constraint_flag | u(1) |
|   no_ladf_constraint_flag | u(1) |
|   no_transform_skip_constraint_flag | u(1) |
|   no_act_constraint_flag | u(1) |
|   no_lmcs_constraint_flag | u(1) |
|   no_cu_qp_delta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   no_tsrc_constraint_flag | u(1) |
|   no_mixed_nalu_types_in_pic_constraint_flag | u(1) |
|   no_trail_constraint_flag | u(1) |
|   no_stsa_constraint_flag | u(1) |
|   no_rasl_constraint_flag | u(1) |

TABLE 9-continued

General constraint information including three groups of syntax elements

|  | Descriptor |
|---|---|
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| //end of Group I:non-intra-non-inter group | |
| //Group II: intra group | |
| no_qtbtt_dual_tree_intra_constraint_flag | u(1) |
| no_mrl_constraint_flag | u(1) |
| no_isp_constraint_flag | u(1) |
| no_mip_constraint_flag | u(1) |
| no_cclm_constraint_flag | u(1) |
| no_lfnst_constraint_flag | u(1) |
| no_ibc_constraint_flag | u(1) |
| no_bdpcm_constraint_flag | u(1) |
| no_palette_constraint_flag | u(1) |
| //end of Group II:intra group | |
| //Group III: inter group | |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_sbt_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ciip_constraint_flag | u(1) |
| no_gpm_constraint_flag | u(1) |
| //end of Group III:inter group | |
| while( !byte_aligned( ) ) | |
|   gci_alignment_zero_bit | f(1) |
| gci_num_reserved_bytes | u(8) |
| for( i = 0; i < gci_num_reserved_bytes; i++ ) | |
|   gci_reserved_byte[ i ] | u(8) |
| } | |

In Main 10 Still Picture or Main 10 4:4:4 Still Picture profile, conformance of a bitstream can be indicated by a one picture only constraint flag (e.g., general_one_picture_only_constraint_flag=1 in Table 9) together with profile identification information (e.g., general_profile_idc=1 in Table 5). When the one picture only constraint flag is equal to 1, the value of an intra only constraint falg is equal to 1. In other profiles, such as a profile including only intra pictures, the intra only constraint flag can also be equal to 1.

When the intra only constraint flag is equal to 1, the values of the syntax elements in the inter group (Group III), such as no_ref_wraparound_constraint_flag, no_temporal_mvp_constraint_flag, and the like in Table 9, are all equal to 1.

Therefore, with the knowledge of the groups of syntax elements, the decoder is able to terminate the parsing of the general constraint information early which can be beneficial to the decoding speed and procedure.

In an embodiment, as shown in Table 10, the general constraint information includes two groups of syntax elements: non-inter group (Group I) and inter group (Group II). The inter group (Group II) can include a trunk of syntax elements related to inter coding tools. The non-inter group (Group I) can include a trunk of syntax elements not related to the inter coding tools. In an example, the non-inter group (Group I) appears in the bitstream first followed by the inter group (Group II).

As described above, the general constraint information in Table 10 can be included in profile information such as profile_tier_level( ) in Table 5.

TABLE 10

General constraint information including two groups of syntax elements

|  | Descriptor |
|---|---|
| general_constraint_info( ) { | |
| //Group I: non-inter group | |
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_res_change_in_clvs_constraint_flag | u(1) |
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mts_constraint_flag | u(1) |
| no_ladf_constraint_flag | u(1) |
| no_transform_skip_constraint_flag | u(1) |
| no_act_constraint_flag | u(1) |
| no_lmcs_constraint_flag | u(1) |
| no_cu_qp_delta_constraint_flag | u(1) |
| no_chroma_qp_offset_constraint_flag | u(1) |
| no_dep_quant_constraint_flag | u(1) |
| no_sign_data_hiding_constraint_flag | u(1) |
| no_tsrc_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| no_qtbtt_dual_tree_intra_constraint_flag | u(1) |
| no_mrl_constraint_flag | u(1) |
| no_isp_constraint_flag | u(1) |
| no_mip_constraint_flag | u(1) |
| no_cclm_constraint_flag | u(1) |
| no_lfnst_constraint_flag | u(1) |
| no_ibc_constraint_flag | u(1) |
| no_bdpcm_constraint_flag | u(1) |
| no_palette_constraint_flag | u(1) |
| //end of Group I:non-inter group | |
| //Group II: inter group | |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_sbt_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ciip_constraint_flag | u(1) |
| no_gpm_constraint_flag | u(1) |
| //end of Group II:inter group | |
| while( !byte_aligned( ) ) | |
|   gci_alignment_zero_bit | f(1) |
| gci_num_reserved_bytes | u(8) |
| for( i = 0; i < gci_num_reserved_bytes; i++ ) | |
|   gci_reserved_byte[ i ] | u(8) |
| } | |

In Main 10 Still Picture or Main 10 4:4:4 Still Picture profile, conformance of a bitstream can be indicated by the one picture only constraint flag (e.g. general_one_picture_only_constraint_flag=1 in Table 10) together with the profile identification information (general_profile_idc=1 in Table 5). When the one picture only constraint flag is equal to 1, the value of the intra only constraint flag is equal to 1. In other profiles, such as a profile including only intra pictures, the intra only constraint flag can also be equal to 1.

When the intra only constraint flag is equal to 1, the values of syntax elements in the inter group (Group II), such as no_ref_wraparound_constraint_flag, no_temporal_mvp_constraint_flag, and the like in Table 10, are all equal to 1.

Therefore, with the knowledge of the groups of syntax elements, the decoder is able to terminate the parsing of the general constraint information early which an be beneficial to the decoding speed and procedure.

According to some embodiments, whenever a new syntax element is introduced to the general constraint information (e.g., general_constraint_info( ) in Table 9 or Table 10), the new syntax element can be included in an existing group or subgroup so that the general constraint information does not need to form a new group relative to the existing groups.

In an embodiment, for the general constraint information including the non-intra-non-inter group (Group I), intra group (Group II), and inter group (Group III), when a new syntax element related to an intra coding tool is to be included in the general constraint information, the new syntax element can be included in the intra group (Group II). When a new syntax element related to an inter coding tool is to be included in the general constraint information, the new syntax element can be included in the inter group (Group III). When a new syntax element is not related to an intra coding nor an inter coding tool, the new syntax element can be included in the non-intra-non-inter group (Group I).

In an example as shown in Table 11, a new syntax element no weighted prediction constraint flag (e.g., no_weighted_pred_constraint_flag) specifying whether weighted prediction can be applied to a P slice is introduced to the general constraint information including three groups of syntax elements, the new syntax element can be included in the inter group (Group III) since it is a syntax element related to an inter coding tool.

As described above, the general constraint information in Table 11 can be included in profile information such as profile_tier_level( ) in Table 5.

TABLE 11

A new syntax element introducing to the general constraint information including three groups of syntax elements

|  | Descriptor |
|---|---|
| general_constraint_info( ) { | |
| //Group I: non-intra-non-inter group | |
| ... | |
| //end of Group I:non-intra-non-inter group | |
| //Group II: intra group | |
| ... | |
| //end of Group II:intra group | |
| //Group III: inter group | |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_sbt_constraint_flag | u(1) |

TABLE 11-continued

A new syntax element introducing to the general constraint information including three groups of syntax elements

|  | Descriptor |
|---|---|
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ciip_constraint_flag | u(1) |
| no_gpm_constraint_flag | u(1) |
| no_weighted_pred_constraint_flag | u(1) |
| //end of Group III:inter group | |
| while( !byte_aligned( ) ) | |
| gci_alignment_zero_bit | f(1) |
| gci_num_reserved_bytes | u(8) |
| for( i = 0; i < gci_num_reserved_bytes; i++ ) | |
| gci_reserved_byte[ i ] | u(8) |
| } | |

In an embodiment, for the general constraint information including the non-inter group (Group I) and the inter group (Group II), when a new syntax element related to an inter coding tool is to be included in the general constraint information, the new syntax can be included in the inter group (Group II). When a new syntax element not related to an inter coding tool is to be included in the general constraint information, the new syntax element can be included in the non-inter group (Group I).

In an example as shown in Table 12, a new syntax element no weighted prediction constraint flag (e.g., no_weighted_pred_constraint_flag) specifying whether weighted prediction can be applied to a P slice is introduced to the general constraint information including two groups of syntax elements, the new syntax element can be included in the inter group (Group II) since it is a syntax element related to an inter coding tool.

As described above, the general constraint information in Table 12 can be included in profile information such as profile_tier_level( ) in Table 5.

TABLE 12

A new syntax element introducing to the general constraint information including two groups of syntax elements

|  | Descriptor |
|---|---|
| general_constraint_info( ) { | |
| //Group I: other group | |
| ... | |
| //end of Group I:other group | |
| //Group II: inter group | |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_sbt_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ciip_constraint_flag | u(1) |
| no_gpm_constraint_flag | u(1) |
| no_weighted_pred_constraint_flag | u(1) |
| //end of Group II:inter group | |
| while( !byte_aligned( ) ) | |

TABLE 12-continued

A new syntax element introducing to the general constraint information including two groups of syntax elements

| | Descriptor |
|---|---|
| gci_alignment_zero_bit | f(1) |
| gci_num_reserved_bytes | u(8) |
| for( i = 0; i < gci_num_reserved_bytes; i++ ) | |
| gci_reserved_byte[ i ] | u(8) |
| } | |

According to aspects of the disclosure, byte alignment can be checked after each group or subgroup for the ease of parsing and early termination.

Table 13 shows an exemplary byte alignment for each group in the general constraint information including three groups of syntax elements. The byte alignment is checked at the end of each group or subgroup. If the syntax elements signaled in a group or subgroup are not byte aligned, additional bits can be signaled to ensure the total bits used for each group are byte aligned.

As described above, the general constraint information in Table 13 can be included in profile information such as profile_tier_level( ) in Table 5.

TABLE 13

Byte alignment for each group in the general constraint information including three groups of syntax elements

| | Descriptor |
|---|---|
| general_constraint_info( ) { | |
| //Group I: non-intra-non-inter group | |
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_res_change_in_clvs_constraint_flag | u(1) |
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mts_constraint_flag | u(1) |
| no_ladf_constraint_flag | u(1) |
| no_transform_skip_constraint_flag | u(1) |
| no_act_constraint_flag | u(1) |
| no_lmcs_constraint_flag | u(1) |
| no_cu_qp_delta_constraint_flag | u(1) |
| no_chroma_qp_offset_constraint_flag | u(1) |
| no_dep_quant_constraint_flag | u(1) |
| no_sign_data_hiding_constraint_flag | u(1) |
| no_tsrc_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |

TABLE 13-continued

Byte alignment for each group in the general constraint information including three groups of syntax elements

| | Descriptor |
|---|---|
| no_aps_constraint_flag | u(1) |
| while( !byte_aligned( ) ) | |
| gci_alignment_zero_bit | f(1) |
| //end of Group I:non-intra-non-inter group | |
| //Group II: intra group | |
| no_qtbtt_dual_tree_intra_constraint_flag | u(1) |
| no_mrl_constraint_flag | u(1) |
| no_isp_constraint_flag | u(1) |
| no_mip_constraint_flag | u(1) |
| no_cclm_constraint_flag | u(1) |
| no_lfnst_constraint_flag | u(1) |
| no_ibc_constraint_flag | u(1) |
| no_bdpcm_constraint_flag | u(1) |
| no_palette_constraint_flag | u(1) |
| while( !byte_aligned( ) ) | |
| gci_alignment_zero_bit | f(1) |
| //end of Group II:intra group | |
| //Group III: inter group | |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_sbt_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ciip_constraint_flag | u(1) |
| no_gpm_constraint_flag | u(1) |
| while( !byte_aligned( ) ) | |
| gci_alignment_zero_bit | f(1) |
| //end of Group III:inter group | |
| gci_num_reserved_bytes | u(8) |
| for( i = 0; i < gci_num_reserved_bytes; i++ ) | |
| gci_reserved_byte[ i ] | u(8) |
| } | |

Table 14 shows an exemplary byte alignment for each group in the general constraint information including two groups of syntax elements. The byte alignment is checked at the end of each group or subgroup. If the syntax elements signaled in a group or subgroup are not byte aligned, additional bits are signaled to ensure the total bits used for each group are byte aligned.

As described above, the general constraint information in Table 14 can be included in profile information such as profile_tier_level( ) in Table 5.

TABLE 14

Byte alignment for each group in the general constraint information including two groups of syntax elements

| | Descriptor |
|---|---|
| general_constraint_info( ) { | |
| //Group I: other group | |
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_res_change_in_clvs_constraint_flag | u(1) |

TABLE 14-continued

Byte alignment for each group in the general constraint information including two groups of syntax elements

| | Descriptor |
|---|---|
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mts_constraint_flag | u(1) |
| no_ladf_constraint_flag | u(1) |
| no_transform_skip_constraint_flag | u(1) |
| no_act_constraint_flag | u(1) |
| no_lmcs_constraint_flag | u(1) |
| no_cu_qp_delta_constraint_flag | u(1) |
| no_chroma_qp_offset_constraint_flag | u(1) |
| no_dep_quant_constraint_flag | u(1) |
| no_sign_data_hiding_constraint_flag | u(1) |
| no_tsrc_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| no_qtbtt_dual_tree_intra_constraint_flag | u(1) |
| no_mrl_constraint_flag | u(1) |
| no_isp_constraint_flag | u(1) |
| no_mip_constraint_flag | u(1) |
| no_cclm_constraint_flag | u(1) |
| no_lfnst_constraint_flag | u(1) |
| no_ibc_constraint_flag | u(1) |
| no_bdpcmc_onstraint_flag | u(1) |
| no_palette_constraint_flag | u(1) |
| while( !byte_aligned( ) ) | |
|   gci_alignment_zero_bit | f(1) |
| //end of Group I:non-inter group | |
| //Group II: inter group | |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_sbt_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ciip_constraint_flag | u(1) |
| no_gpm_constraint_flag | u(1) |
| while( !byte_aligned( ) ) | |
|   gci_alignment_zero_bit | f(1) |
| //end of Group II:inter group | |
| gci_num_reserved_bytes | u(8) |
| for( i = 0; i < gci_num_reserved_bytes; i++ ) | |
|   gci_reserved_byte[ i ] | u(8) |
| } | |

VII. Flowchart

Figure 8:
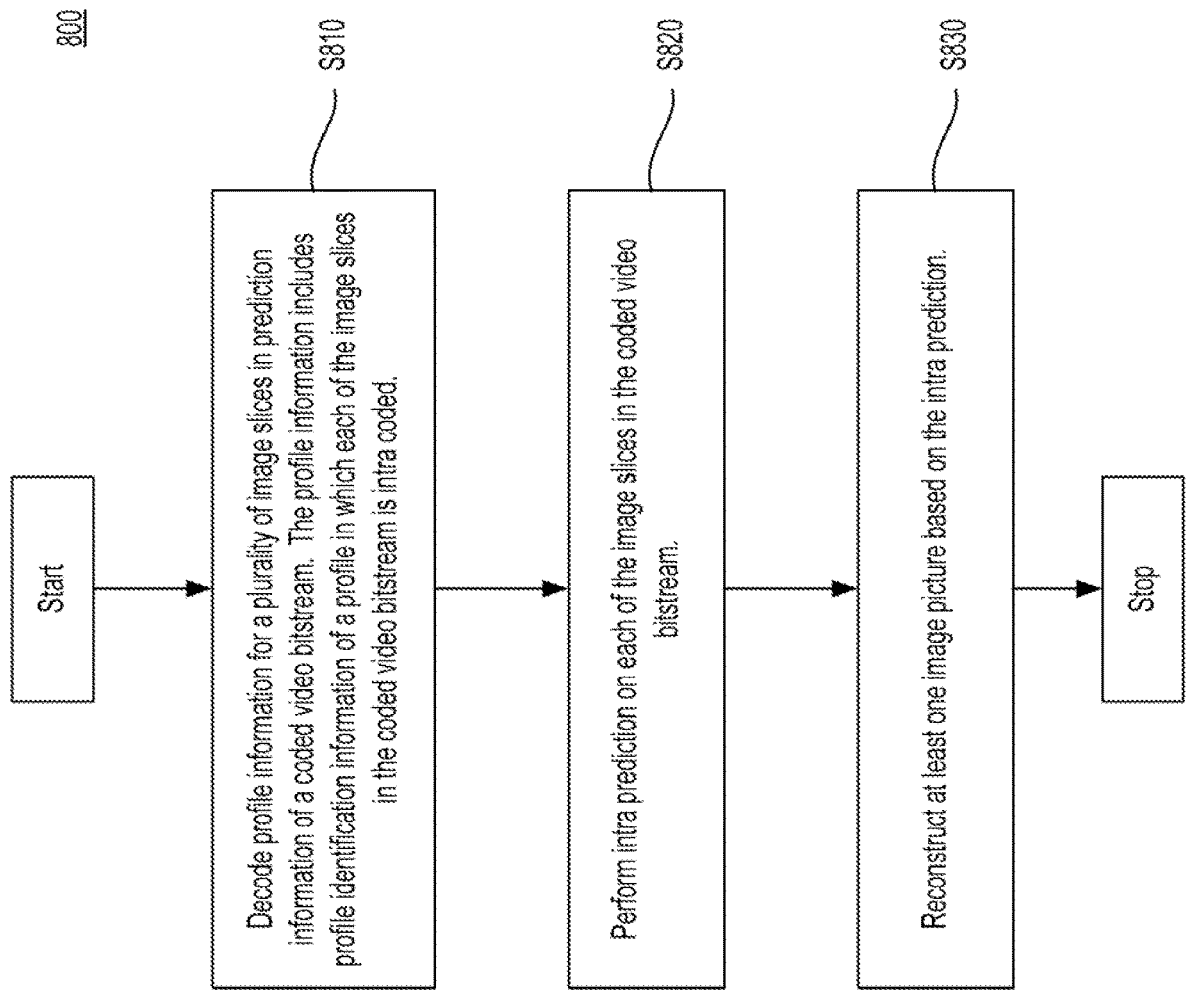
FIG. 8 shows an exemplary flowchart in accordance with an embodiment.

FIG. 8 shows a flow chart outlining an exemplary process (800) according to an embodiment of the disclosure. In various embodiments, the process (800) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (800) is implemented in software instructions, thus when the processing circuitry executes the software instructions, the processing circuitry performs the process (800).

The process (800) may generally start at step (S810), where the process (800) decodes profile information for a plurality of image slices in prediction information of a coded video bitstream. The profile information includes profile identification information of a profile in which each of the image slices in the coded video bitstream is intra coded. Then, the process (800) proceeds to step (S820).

At step (S820), the process (800) performs intra prediction on each of the image slices in the coded video bitstream. Then, the process (800) proceeds to step (S830).

At step (S830), the process (800) reconstructs at least one image picture based on the intra prediction. Then, the process (800) terminates.

In an embodiment, the profile information includes a first flag indicating whether each of the image slices in the coded video bitstream is intra coded and a second flag indicating whether each of the image slices in the coded video bitstream is included in one picture.

In an embodiment, the first flag is decoded after the second flag and indicates that each of the image slices in the coded video bitstream is intra coded based on the second flag indicating that each of the image slices in the coded video bitstream is included in one picture.

In an embodiment, the first flag indicates that each of the image slices in the coded video bitstream is intra coded based on the profile identification information of the profile in which each of the images slice in the coded video bitstream is intra coded.

In an embodiment, the second flag indicates that each of the image slices in the coded video bitstream is included in one picture based on the profile being a still picture profile in which only one picture is included in the coded video bitstream.

In an embodiment, non-intra related syntax elements are not included in the prediction information based on one of (i) the first flag indicating that each of the image slices in the coded video bitstream is intra coded and (ii) the second flag indicating that each of the image slices in the coded video bitstream is included in one picture.

In an embodiment, the prediction information includes a third flag indicating whether each of the image slices in the coded video bitstream is intra coded and included in one picture. The third flag is not included in the profile information.

In an embodiment, the third flag indicates that each of the image slices in the coded video bitstream is intra coded and included in one picture based on the second flag indicating that each of the image slices in the coded video bitstream is included in one picture.

Figure 9:
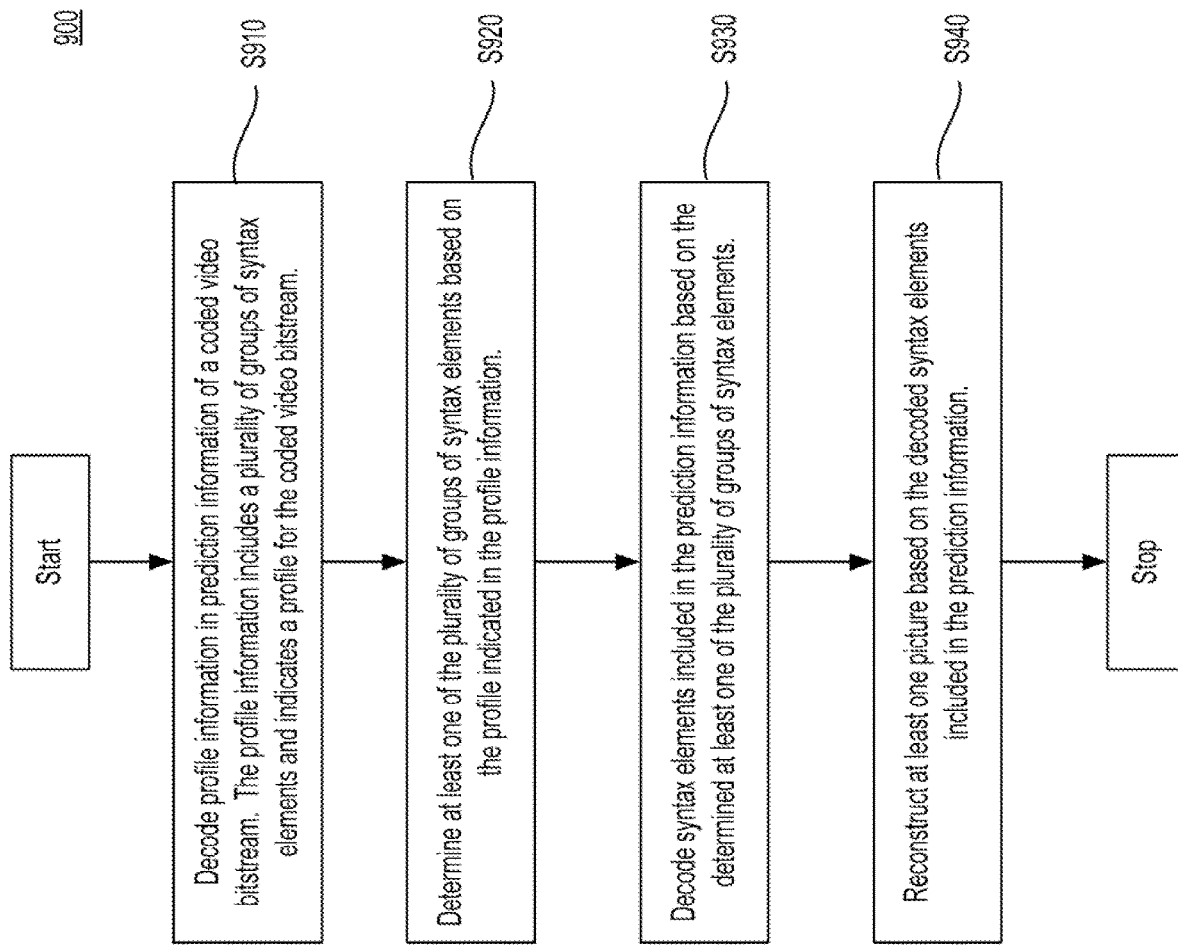
FIG. 9 shows another exemplary flowchart in accordance with an embodiment.

FIG. 9 shows another flow chart outlining an exemplary process (900) according to an embodiment of the disclosure. In various embodiments, the process (900) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (900) is implemented in software instructions, thus when the processing circuitry executes the software instructions, the processing circuitry performs the process (900).

The process (900) may generally start at step (S910), where the process (900) decodes profile information in prediction information of a coded video bitstream. The profile information includes a plurality of groups of syntax elements and indicates a profile for the coded video bitstream. Then, the process (900) proceeds to step (S920).

At step (S920), the process (900) determines at least one of the plurality of groups of syntax elements based on the profile indicated in the profile information. Then, the process (900) proceeds to step (S930).

At step (S930), the process (900) decodes syntax elements included in the prediction information based on the determined at least one of the plurality of groups of syntax elements. Then, the process (900) proceeds to step (S940).

At step (S940), the process (900) reconstructs at least one picture based on the decoded syntax elements included in the prediction information.

In an embodiment, an order of the determined at least one of the plurality of groups of syntax elements for the profile is in accordance with a predetermined order of the plurality of groups of syntax elements in the profile information.

In an embodiment, byte alignment is checked for each of the plurality of groups of syntax elements in the profile information.

VIII. Computer System

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
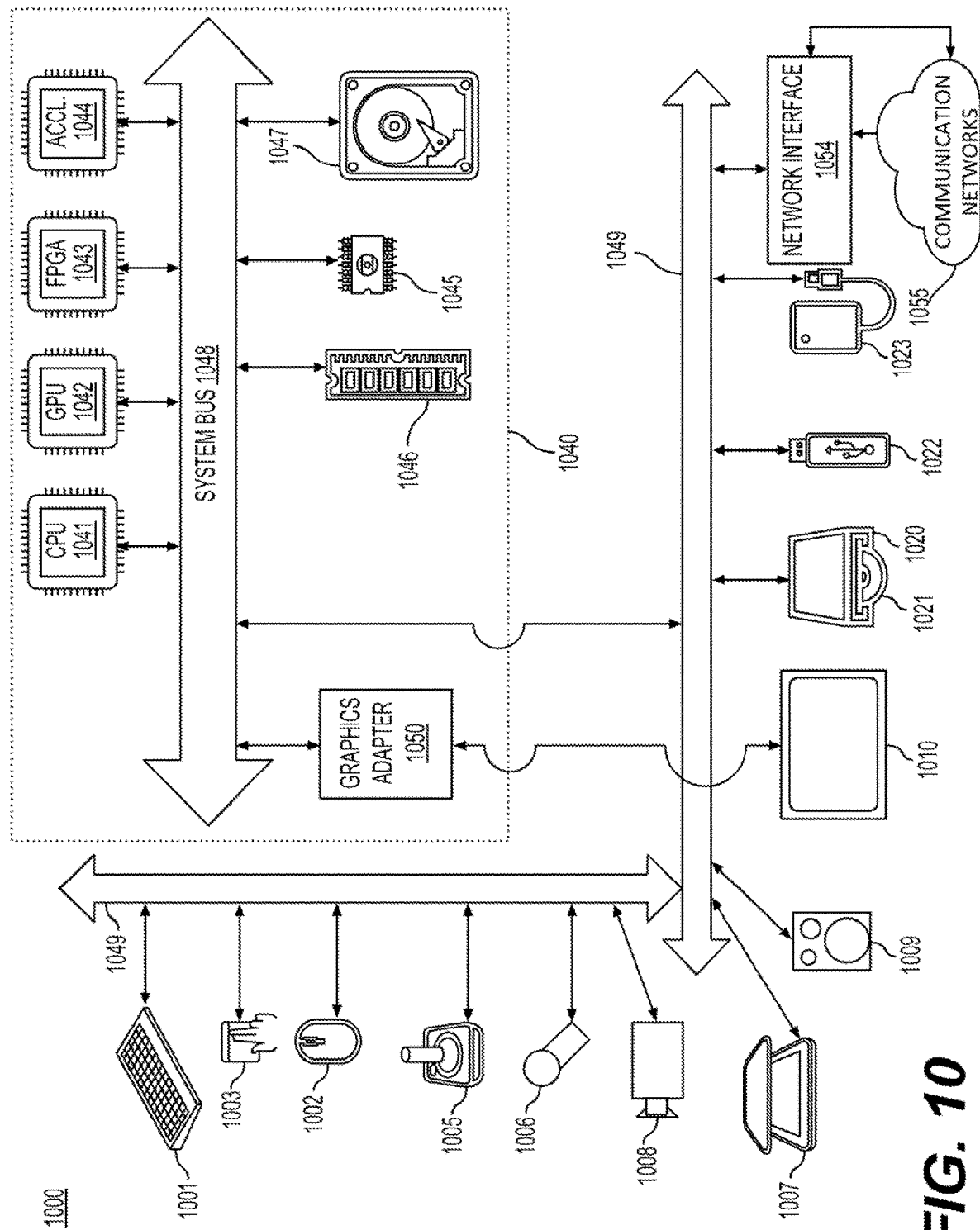
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1010)) can be connected to a system bus (1048) through a graphics adapter (1050).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include a network interface (1054) to one or more communication networks (1055). The one or more communication networks (1055) can for example be wireless, wireline, optical. The one or more communication networks (1055) can further be local, wide-area, metropolitan, vehicular and industrial, real-time, delay-tolerant, and so on. Examples of the one or more communication networks (1055) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), and so forth. These devices, along with Read-only memory (ROM) (1045), Random-access memory (1046), internal mass storage (1047) such as internal non-user accessible hard drives, SSDs, and the like, may be connected through the system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

AMVP: Advanced Motion Vector Prediction
ASIC: Application-Specific Integrated Circuit
ATMVP: Alternative/Advanced Temporal Motion Vector Prediction
BMS: Benchmark Set
BV: Block Vector
CANBus: Controller Area Network Bus
CB: Coding Block
CD: Compact Disc
CPR: Current Picture Referencing
CPU: Central Processing Unit
CRT: Cathode Ray Tube
CTB: Coding Tree Block
CTU: Coding Tree Unit
CU: Coding Unit
DPB: Decoder Picture Buffer
DVD: Digital Video Disc
FPGA: Field Programmable Gate Area
GOP: Group of Pictures
GPU: Graphics Processing Unit
GSM: Global System for Mobile communications
HEVC: High Efficiency Video Coding
HRD: Hypothetical Reference Decoder
IBC: Intra Block Copy
IC: Integrated Circuit
JEM: Joint Exploration Model
JVET: Joint Video Exploration Team
LAN: Local Area Network
LCD: Liquid-Crystal Display
LTE: Long-Term Evolution
MV: Motion Vector
OLED: Organic Light-Emitting Diode
PB: Prediction Block
PCI: Peripheral Component Interconnect
PH: Picture Header
PLD: Programmable Logic Device
PPS: Picture Parameter Setting
POC: Picture Order Count
PU: Prediction Unit
RAM: Random Access Memory RB SP: Raw Byte Sequence Payload
ROM: Read-Only Memory
RPL: Reference Picture List
SCC: Screen Content Coding
SDR: Standard Dynamic Range
SEI: Supplementary Enhancement Information
SNR: Signal Noise Ratio
SPS: Sequence Parameter Set
SSD: Solid-state Drive
TU: Transform Unit
USB: Universal Serial Bus
VUI: Video Usability Information
VVC: Versatile Video Coding

What is claimed is:

1. A method of video encoding, comprising:
   determining, by processing circuitry of a video encoder, that a coded video bitstream conforms to one of a Main 10 still picture profile or a Main 4:4:4 10 still picture profile;
   generating profile information for a plurality of image slices to be included in the coded video bitstream, the profile information indicating that each of the image slices is to be intra coded and indicating the one of the Main 10 still picture profile or the Main 4:4:4 10 still picture profile;
   constraining only one picture to be included in the coded video bitstream according to the one of the Main 10 still picture profile or the Main 4:4:4 10 still picture profile;
   performing intra prediction on each of the image slices; and
   encoding the picture based on the intra prediction and according to the one of the Main 10 still picture profile or the Main 4:4:4 10 still picture profile to form the coded video bitstream.

2. The method of claim 1, wherein the profile information includes a first flag indicating whether each of the image slices is to be intra coded and a second flag indicating whether each of the image slices is included in the one picture.

3. The method of claim 2, wherein the first flag is encoded after the second flag and indicates that each of the image slices is to be intra coded based on the second flag indicating that each of the image slices is included in the one picture.

4. The method of claim 2, wherein the first flag indicates that each of the image slices is to be intra coded based on the generated profile information indicating that each of the image slices is intra coded.

5. The method of claim 2, wherein the second flag indicates that each of the image slices is included in the one picture based on the generated profile information indicating a still picture profile in which only the one picture is to be included in the coded video bitstream.

6. The method of claim 2, wherein non-intra related syntax elements are not included in prediction information of the coded video bitstream based on one of (i) the first flag indicating that each of the image slices is to be intra coded or (ii) the second flag indicating that each of the image slices is included in the one picture.

7. The method of claim 2, wherein prediction information of the coded video bitstream includes a third flag indicating whether each of the image slices is to be intra coded and included in the one picture, the third flag not being included in the profile information.

8. The method of claim 7, wherein the third flag indicates that each of the image slices is to be intra coded and included in the one picture based on the second flag indicating that each of the image slices is included in the one picture.

9. An apparatus, comprising:
   processing circuitry configured to
      determine that a coded video bitstream conforms to one of a Main 10 still picture profile or a Main 4:4:4 10 still picture profile;
      generate profile information for a plurality of image slices to be included in the coded video bitstream, the profile information indicating that each of the image slices is to be intra coded and indicating the one of the Main 10 still picture profile or the Main 4:4:4 10 still picture profile;
      constrain only one picture to be included in the coded video bitstream according to the one of the Main 10 still picture profile or the Main 4:4:4 10 still picture profile;
      perform intra prediction on each of the image slices; and
      encode the picture based on the intra prediction and according to the one of the Main 10 still picture profile or the Main 4:4:4 10 still picture profile to form the coded video bitstream.

10. The apparatus of claim 9, wherein the profile information includes a first flag indicating whether each of the image slices is to be intra coded and a second flag indicating whether each of the image slices is included in the one picture.

11. The apparatus of claim 10, wherein the first flag is encoded after the second flag and indicates that each of the image slices is intra coded based on the second flag indicating that each of the image slices is included in the one picture.

12. The apparatus of claim 10, wherein the first flag indicates that each of the image slices is to be intra coded based on the generated profile information indicating that each of the image slices is intra coded.

13. The apparatus of claim 10, wherein the second flag indicates that each of the image slices is included in the one picture based on the generated profile information indicating a still picture profile in which only the one picture is included in the coded video bitstream.

14. The apparatus of claim 10, wherein non-intra related syntax elements are not included in prediction information of the coded video bitstream based on one of (i) the first flag indicating that each of the image slices is to be intra coded or (ii) the second flag indicating that each of the image slices is included in the one picture.

15. The apparatus of claim 10, wherein prediction information of the coded video bitstream includes a third flag indicating whether each of the image slices is to be intra coded and included in the one picture, the third flag not being included in the profile information.

16. The apparatus of claim 15, wherein the third flag indicates that each of the image slices is to be intra coded and included in the one picture based on the second flag indicating that each of the image slices is included in the one picture.

17. A non-transitory computer-readable storage medium storing instructions which, when executed by at least one processor, cause the at least one processor to perform the method according to claim 1.

18. A method of video encoding, comprising:
   generating, by processing circuitry of a video encoder, profile information in prediction information of a coded video bitstream, the profile information including a plurality of groups of syntax elements and profile identification information, the profile identification information indicating a profile for the coded video bitstream; and encoding at least one picture based on one of the plurality of groups of syntax elements included in the profile information, the one of the plurality of groups of syntax elements is selected based on the profile indicated in the profile identification information.

19. The method of claim 18, wherein an order of the plurality of groups of syntax elements for the profile information is predetermined.

20. The method of claim 18, wherein byte alignment is checked for each of the plurality of groups of syntax elements.

* * * * *